(12) United States Patent
Lilburn et al.

(10) Patent No.: US 10,222,454 B2
(45) Date of Patent: Mar. 5, 2019

(54) COMBINING REFLECTED SIGNALS

(71) Applicant: Navico Holding AS, Egersund (NO)

(72) Inventors: Lindsay Lilburn, Auckland (NZ); Roger Phillips, Auckland (NZ); Ee Chen, Auckland (NZ)

(73) Assignee: Navico Holding AS, Egersund (NO)

( * ) Notice: Subject to any disclaimer, the term of this patent is extended or adjusted under 35 U.S.C. 154(b) by 520 days.

(21) Appl. No.: 14/829,574

(22) Filed: Aug. 18, 2015

(65) Prior Publication Data

US 2016/0054432 A1 Feb. 25, 2016

Related U.S. Application Data

(60) Provisional application No. 62/039,307, filed on Aug. 19, 2014.

(51) Int. Cl.
*G01S 7/28* (2006.01)
*G01S 13/28* (2006.01)

(52) U.S. Cl.
CPC .......... *G01S 7/2806* (2013.01); *G01S 13/28* (2013.01)

(58) Field of Classification Search
CPC ...... G01S 7/2806; G01S 13/28; G01S 13/282; G01S 7/282; G01S 13/0209; G01S 13/42; G01S 13/9307; G01S 13/24; G01S 13/53; G01S 7/288; G01S 7/28; G01S 7/38; G01S 13/003; G01S 13/9035; G01S 7/021; G01S 7/2923; G01S 7/2125; G01S 13/284; G01S 17/325; G01S 7/52047; G01S 13/90; G01S 7/2921; G01S 7/298; G01S 7/4052; H04B 7/2125; H04L 25/00; H04L 12/4625; H04L 47/30; G10L 21/0208; H04N 5/363

USPC ................................................ 342/195, 132
See application file for complete search history.

(56) References Cited

U.S. PATENT DOCUMENTS

| | | | | |
|---|---|---|---|---|
| 3,825,899 A | * | 7/1974 | Haeberle | H04B 7/2125 370/324 |
| 4,021,805 A | | 5/1977 | Effinger et al. | |
| 4,028,700 A | | 6/1977 | Carey et al. | |
| 4,047,173 A | | 9/1977 | Miller | |
| 4,114,154 A | | 9/1978 | Sarfati | |
| 4,211,485 A | | 7/1980 | Koreicho | |
| 4,216,474 A | | 8/1980 | Levine | |
| 4,243,988 A | | 1/1981 | Kang et al. | |
| 4,328,495 A | | 5/1982 | Thue | |
| 4,353,067 A | * | 10/1982 | Mims | G01S 13/284 342/189 |
| 4,566,010 A | | 1/1986 | Collins | |

(Continued)

FOREIGN PATENT DOCUMENTS

| CN | 101464513 A | 6/2009 |
|---|---|---|
| JP | 2982769 B2 | 11/1999 |
| JP | 2009-128278 A | 6/2009 |

*Primary Examiner* — Timothy A Brainard
*Assistant Examiner* — Nuzhat Pervin
(74) *Attorney, Agent, or Firm* — Nelson Mullins Riley & Scarborough LLP

(57) ABSTRACT

A system, computer-readable medium, and method for receiving reflected signals. In one implementation, the system includes a receiver, a pulse compressor, a framer, and a frame generator. The receiver receives the reflected signals. The pulse compressor compresses the reflected signals and the framer interprets the reflected signals. The frame generator combines one or more modified frames associated with the reflected signals.

19 Claims, 16 Drawing Sheets

(56) References Cited

U.S. PATENT DOCUMENTS

| | | | |
|---|---|---|---|
| 4,626,853 A | 12/1986 | Lee et al. | |
| 4,686,534 A | 8/1987 | Eddy | |
| 4,772,889 A | 9/1988 | Elleaume | |
| 4,800,388 A | 1/1989 | Okada | |
| 4,851,848 A * | 7/1989 | Wehner | G01S 13/24 342/25 D |
| 4,929,954 A | 5/1990 | Elleaume | |
| 4,989,010 A | 1/1991 | Crevoulin et al. | |
| 5,003,313 A | 3/1991 | Doriath | |
| 5,128,681 A | 7/1992 | McGroary et al. | |
| 5,141,308 A | 8/1992 | Danckwerth et al. | |
| 5,151,702 A | 9/1992 | Urkowitz | |
| 5,173,706 A | 12/1992 | Urkowitz | |
| 5,227,801 A * | 7/1993 | Pierce | G01S 13/9035 342/192 |
| 5,309,161 A | 5/1994 | Urkowitz et al. | |
| 5,389,933 A | 2/1995 | Golinsky | |
| 5,414,428 A | 5/1995 | Gallagher et al. | |
| 5,481,270 A | 1/1996 | Urkowitz et al. | |
| 5,943,004 A * | 8/1999 | Groenenboom | G01S 13/24 342/128 |
| 5,977,905 A * | 11/1999 | Le Chevalier | G01S 13/53 342/110 |
| 6,067,043 A * | 5/2000 | Faure | G01S 7/4052 342/135 |
| 6,087,982 A * | 7/2000 | Liu | G01S 7/298 342/179 |
| 6,266,633 B1 * | 7/2001 | Higgins | G10L 21/0208 704/224 |
| 6,297,764 B1 * | 10/2001 | Wormington | G01S 7/2921 342/101 |
| 6,377,204 B1 | 4/2002 | Wurman et al. | |
| 6,669,640 B2 * | 12/2003 | Bae | G01S 7/52047 600/443 |
| 7,019,686 B2 | 3/2006 | Hester et al. | |
| 7,081,846 B1 * | 7/2006 | Sparrow | G01S 7/38 342/14 |
| 7,106,250 B2 | 9/2006 | Blunt et al. | |
| 7,675,458 B2 | 3/2010 | Hubbard et al. | |
| 7,688,257 B1 | 3/2010 | Christianson et al. | |
| 7,764,223 B2 * | 7/2010 | Wade | G01S 7/28 342/107 |
| 7,773,028 B2 * | 8/2010 | Chan | G01S 7/282 342/118 |
| 7,812,758 B2 * | 10/2010 | Morris | G01S 13/90 342/25 A |
| 7,928,901 B2 * | 4/2011 | Huebschman | G01S 13/90 342/179 |
| 8,022,863 B1 | 9/2011 | Nuthalapati | |
| 8,804,483 B2 * | 8/2014 | Shi | H04L 25/493 370/205 |
| 9,691,133 B1 * | 6/2017 | Liu | G06T 3/4076 |
| 2003/0045794 A1 * | 3/2003 | Bae | G01S 7/52047 600/437 |
| 2004/0027274 A1 * | 2/2004 | Driessen | G01S 7/2923 342/91 |
| 2005/0179585 A1 * | 8/2005 | Walker | G01S 13/0209 342/134 |
| 2005/0185697 A1 * | 8/2005 | Gargin | H04B 1/69 375/130 |
| 2008/0018526 A1 * | 1/2008 | Wade | G01S 7/28 342/204 |
| 2008/0111734 A1 | 5/2008 | Fam et al. | |
| 2008/0136704 A1 * | 6/2008 | Chan | G01S 7/282 342/201 |
| 2008/0252763 A1 * | 10/2008 | Shefer | H04N 5/363 348/308 |
| 2008/0316086 A1 * | 12/2008 | Hoctor | G01S 7/288 342/137 |
| 2009/0002680 A1 * | 1/2009 | Ruff | G01S 17/325 356/5.09 |
| 2009/0121920 A1 | 5/2009 | Mullarkey et al. | |
| 2009/0252179 A1 * | 10/2009 | Sultan | H04L 12/4625 370/470 |
| 2010/0039313 A1 * | 2/2010 | Morris | G01S 13/003 342/25 F |
| 2011/0038309 A1 * | 2/2011 | Shi | H04L 25/00 370/328 |
| 2012/0262332 A1 | 10/2012 | Ohnishi | |
| 2012/0293361 A1 | 11/2012 | Mowbray et al. | |
| 2014/0211624 A1 * | 7/2014 | Rajasekaran | H04L 47/30 370/235 |
| 2014/0341137 A1 * | 11/2014 | Crowle | G01S 7/021 370/329 |
| 2016/0259041 A1 * | 9/2016 | Tan | G01S 13/003 |

* cited by examiner

COMBINING REFLECTED SIGNALS

CROSS-REFERENCE TO RELATED APPLICATIONS

This application claims the benefit of U.S. Provisional Patent Application Ser. No. 62/039,307, filed Aug. 19, 2014, titled COMBINING RADAR DATA, and the disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In radar systems, it is often important to have clear and unambiguous indications of the presence of a target as part of radar images. It is also important to avoid having radar image variations across a radar range. Echo signals received by radar systems often have different signal and noise characteristics. The combination of received echo signals with their varying signal and noise characteristics while avoiding radar image variation across a radar range is a common problem that arises in the signal processing of radar systems.

SUMMARY

Described herein are implementations of various technologies for a radar system, a computer-readable medium, and a method for processing one or more reflected signals. In one implementation, directed to a radar system for processing one or more reflected signals, the radar system includes a receiver, a pulse compressor, a framer, and a frame generator. The receiver receives the one or more reflected signals. The pulse compressor compresses the one or more reflected signals. The framer interprets the one or more reflected signals. The frame generator combines one or more modified frames associated with the one or more reflected signals.

Described herein are also implementations of various technologies for a non-transitory computer-readable medium having stored thereon instructions that are executable by a processor. The non-transitory computer-readable medium is connected to a receiver and receives one or more reflected signals from the receiver. When the plurality of computer-executable instructions are executed by the processor, the plurality of computer-executable instructions cause the processor to perform various actions. These actions may include a compression operation on the one or more reflected signals and a signal interpretation operation on the one or more reflected signals. The processor can combine one or more modified frames associated with the one or more reflected signals.

Described herein are also implementations of various technologies of a method for processing one or more reflected signals. In one implementation, the method may include receiving the one or more reflected signals. The method may also include compressing the one or more reflected signals. The method may also include interpreting the one or more reflected signals. The method may further include combining one or more modified frames associated with the one or more reflected signals.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various forms of marine electronics data may be received, processed, and/or displayed using a computing device disposed aboard a vessel. Marine electronics data displayed using the computing device may assist an operator of the vessel with navigation and/or other functions. The marine electronics data may include, for example, sonar data, chart data, radar data, and/or navigation data.

In one scenario, radar data may be acquired using a pulse compression radar system. In pulse compression radar systems, as described in detail below, a series of chirp signals of varying wavelengths and/or bandwidths may be transmitted in an uncompressed form to an area proximate to the system. The signals may reflect off of one or more objects, such that one or more reflected signals may be ultimately received by the radar system. In pulse compression radar systems, the received signals may undergo compression in time during signal processing.

For each chirp transmission there is an associated receive period that accommodates the receiving of the one or more reflected signals. The chirp transmission and its associated receive period collectively form a time frame. One or more frames may each have different signal and noise characteristics that are associated with the one or more reflected signals. The simple concatenation of these differing frames may result in problems when displaying an image (e.g., a radar image) of the reflected signals, or the volume of data involved with concatenation may be prohibitively large for timely or cost effective processing.

Various implementations relating to combining radar data that address the aforementioned problems are described herein in more detail with reference to FIGS. 1-16.

I. Pulse Compression Radar

Figure 1:
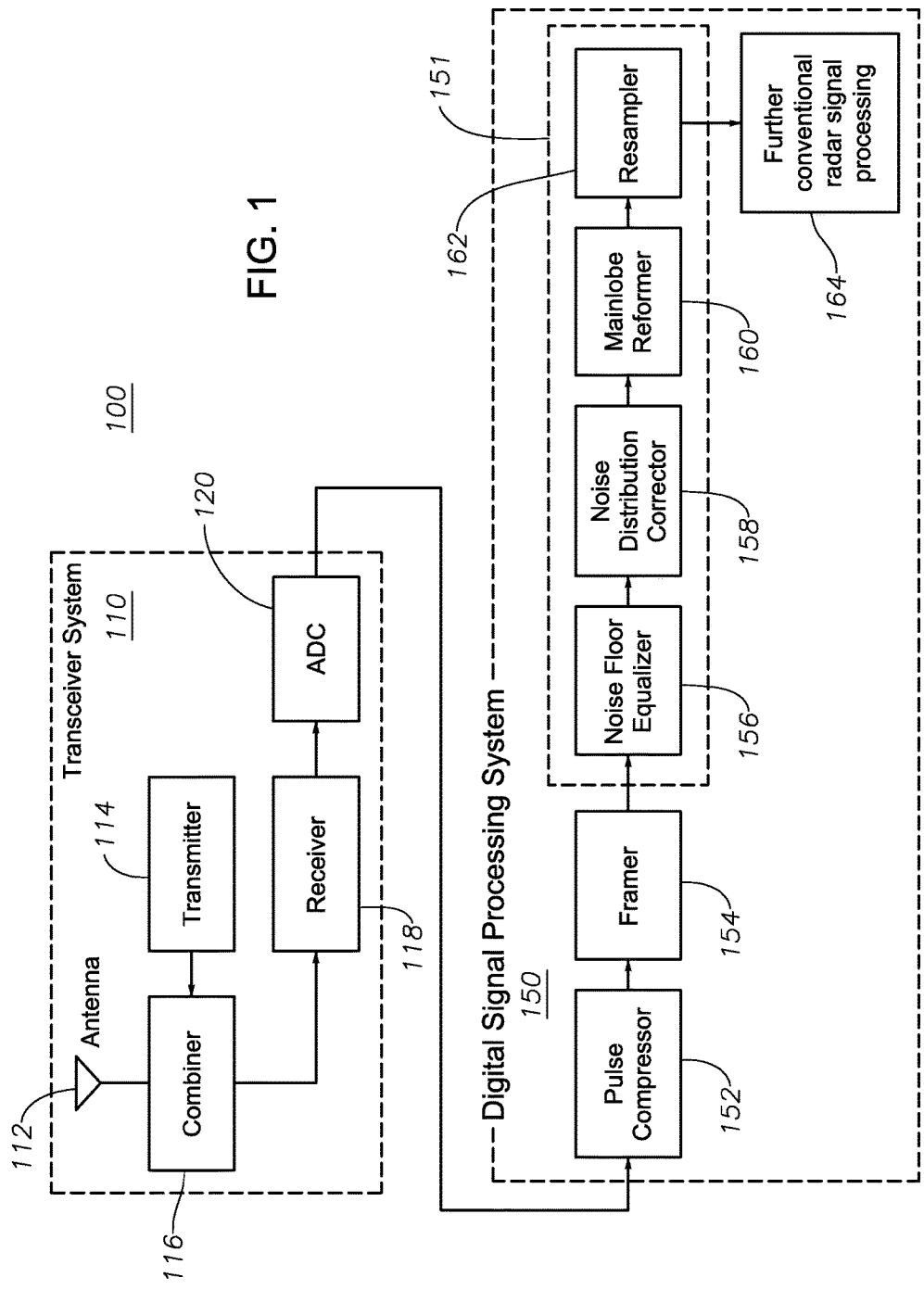
FIG. 1 illustrates a block diagram of a pulse compression radar system in accordance with implementations of various techniques described herein.

FIG. 1 illustrates a block diagram of a pulse compression radar system 100 in accordance with implementations of various techniques described herein. As further described below, the pulse compression radar system 100 may include a transceiver system 110 and a digital signal processing system 150.

Generally, the pulse compression radar system 100 may be used to determine a distance of one or more objects from the system 100 using radio frequency electromagnetic signals (i.e., radar signals) transmitted from the system 100. In particular, the system 100 may transmit a radar signal, which may reflect off of an object. The reflected radar signal may then be received by the pulse compression radar system 100. The determined distances of the one or more objects may be used by the system 100 to determine location(s) of the one or more objects. As further described below, the pulse compression radar system 100 may process one or more frames of one or more reflected signals to generate a "super" frame of concatenated reformed frames associated with the one or more reflected signals.

The system 100 may employ one or more forms of signal processing on the reflected radar signal to determine a time delay between when the transmitted signal was sent and when the reflected signal was received. The time delay may be used to determine the distance of the object from the system 100. In one implementation, a transmitted radar signal and a reflected radar signal may travel through a medium at the speed of light (commonly denoted as c). If the time delay between when the transmitted signal was sent and when the reflected signal was received is designated as t, then the total distance traveled by the transmitted and reflected signals is equal to ct. Accordingly, a distance of the object causing the reflection may be equal to ct/2.

A. Transmitting Signals and Receiving Signals

The transceiver system 110 may be used to transmit and receive radar signals to and from the system 100. In one implementation, the transceiver system 110 may include an antenna 112, a transmitter 114, a combiner 116, a receiver 118, and an analog-to-digital converter (ADC) 120.

The transmitter 114 may prepare a radar signal for transmission, where the antenna 112 coupled to the transmitter 114 may transmit the radar signal into an area proximate to the system 100. The antenna 112 may transmit a carrier frequency modulated by a baseband frequency signal. A baseband signal of the signal transmitted by the antenna 112 may hereinafter be referred to as the transmitted signal. Further, the combiner 116 may be disposed between the antenna 112 and the transmitter 114 to allow for the transmission of multiple frequencies.

In another implementation, each transmitted signal may be composed of one or more bursts. Each burst may be further composed of a series of chirp signals. A chirp signal may be a signal with a frequency that increases or decreases over a period of time, linearly, exponentially or in any one of a variety of other ways.

Figure 2:
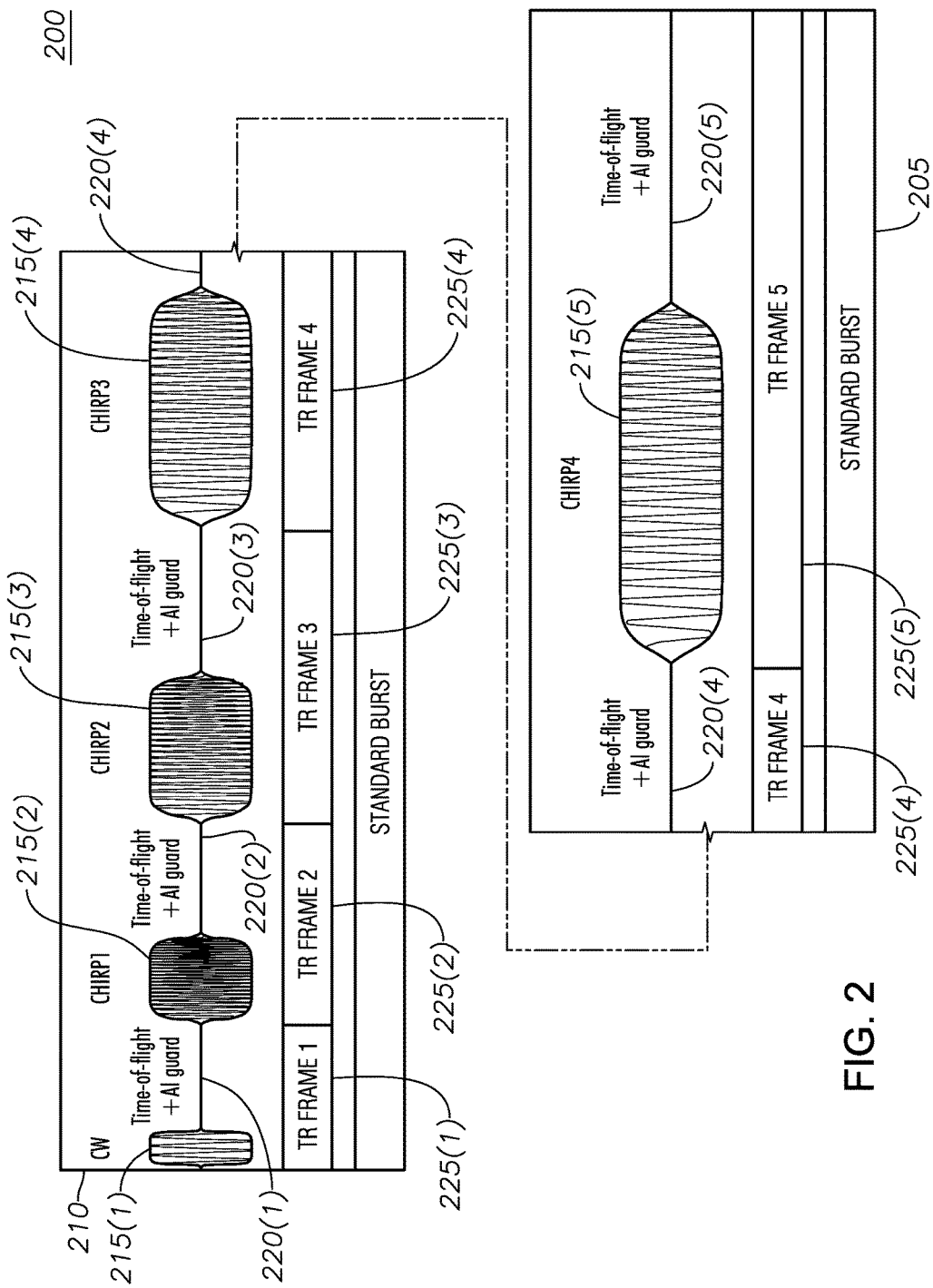
FIG. 2 illustrates a graphical representation of a signal burst in accordance with implementations of various techniques described herein.

For example, FIG. 2 illustrates a graphical representation of a burst 200 in accordance with implementations of various techniques described herein. As shown, the horizontal axis 205 may measure time, while the vertical axis 210 may measure amplitude. Further, the burst 200 may be composed of a series of pulsated chirp signals 215(1), 215(2), 215(3), 215(4), and 215(5). As is also shown, a time delay 220 may follow each of the chirp signals 215 to allow sufficient time for the pulse compression radar system 100 to receive the chirp signals 215 once reflected from an object. Each corresponding pair of chirp signal 215 and time delay 220 may together form a time frame 225. For example, chirp signal 215(4) and time delay 220(4) may combine to form the time frame 225(4).

In order to meet the minimum range, Doppler, and/or energy-on-target requirements associated with the system 100, the number of chirps within a burst may vary. For example, the number of chirps within a burst may vary from 1 to N, where N is a positive integer. To illustrate, the burst may have chirp 1 to chirp N and associated frame 1 to frame N. As an illustrative example, shown in FIG. 2, frame 1 to frame N may correspond to the time frames 225(1) to 225(5), where in this example N=5.

Returning to FIG. 1, the antenna 112 may receive the reflected signal(s) from the object, which may be transferred to receiver 118. The received reflected signals may correspond to the time frames 225 (e.g., frame 1 to frame N) of FIG. 2. In one implementation, the combiner 116 may be disposed between the antenna 112 and the receiver 118, allowing for the receipt of multiple frequencies. The receiver 118 may convert the reflected signal to the baseband frequency, and provide the received signal to the ADC 120. The reflected signal converted to baseband frequency may be hereinafter referred to as the received signal. The receiver 118 may alternatively convert the reflected signal to an intermediate frequency that may be sampled or sub-sampled by the ADC 120 with the final conversion to baseband being performed by well-known digital methods.

In processing the received signal, the ADC 120 may generate a frame of the received signal that contains samples of the received and transmitted signals. The generated sample frames may correspond to the time frames 225 (e.g., frame 1 to frame N) of FIG. 2. For example, for a particular time frame (e.g., the time frame 225(4)), the ADC 120 may generate a sample frame that contains the transmitted portion (e.g., the chirp 215(4)) and the corresponding received signal (e.g., corresponding to reflected signals accommodated by the time delay 220(4)). The sample frame may also contain additional guard time to prevent auto-interference (AI). Auto-interference may occur when reflected signals relating to previous transmissions are received within the time period of a current frame. The output of the ADC 120 may be frames containing samples of the transmitted/received signals.

The ADC 120 may digitize the received signal at a constant sampling rate (now referred to as the digital domain). The received signal may refer to an analog received signal and/or a digitized received signal. Time may have a direct relationship with the number of samples produced by the ADC 120. In the digital domain, time can be measured in units of samples, where time t equals the number of samples generated divided by the sampling rate. In accordance with well-known Nyquist criteria, the sampling rate may be reduced to a rate no less than twice the chirp bandwidth. The ADC 120 may apply a sampling rate that is proportional to the chirp bandwidth of a time frame associated with the received signals. For example, each time frame (e.g., time frames 225(1) to 225(5)) may have a different chirp bandwidth. Accordingly, each time frame may have a different sampling rate. Varying the sample rate according to the chirp bandwidth may reduce downstream processing of received reflected signals.

B. Signal Processing

The digital signal processing system 150 of the pulse compression radar system 100 may be used to determine a time delay between when the transmitted signal was sent and when the received signal was received. In turn, a distance of one or more objects in the area proximate to the radar system 100 may be determined.

In determining this time delay, the time frames 225 of the received signal may be combined. The time frames 225 for the received signal, however, may have different signal and noise characteristics. If the time frames 225 were simply concatenated, problems may arise when displaying a radar image, or the volume of data involved with concatenation may be prohibitively large. The combination of these differing frames may result in an image (e.g., a radar image) of the reflected signals that may vary across a range (e.g., a radar range as displayed on a plan position indicator display). For example, the image displayed may have an uneven noise floor or may exhibit a highly variable range resolution across a range. Parameterization of the chirp signals 215 may encounter similar issues.

In one implementation, the digital signal processing system 150 may employ components and/or techniques for combining the time frames 225 of the received signal. In another implementation, the digital signal processing system 150 can be an appropriately configured field programmable gate array (FPGA).

1. Compression and Truncation

The digital signal processing system 150 may include a pulse compressor 152, and a framer 154. The pulse compressor 152 may correlate the received signal with a reference for the transmitted signal to determine the time delay. This reference may be hereinafter referred to as the reference signal. The output of the pulse compressor 152 may be referred to as the compressed signal. The compressed signal may identify the time delay. The compressed signal frame may be sent to the framer 154, where the framer 154 may be used to interpret and/or combine the time frames 225 of the received signal. The framer 154 may generate one or more truncated compression frames. The framer 154 will be further described with reference to FIG. 5.

2. Frame Generation

The digital signal processing system 150 may also include a frame generator 151 that receives the output of the framer 154. The frame generator 151 generates and combines modified frames associated with the received signal. The frame generator 151 includes a noise floor equalizer 156, a noise distribution corrector 158, a mainlobe reformer 160, and a resampler 162. The noise floor equalizer 156 may correct for differences in mean noise levels between frames of the received signal (e.g., time frames 225). The noise floor equalizer 156 will be further described with reference to FIGS. 6-8. The noise distribution corrector 158 may correct for shifts in the noise distribution caused by a mainlobe reformation process. The noise distribution corrector 158 will be further described with reference to FIGS. 9-11. The mainlobe reformer 160 may normalize mainlobes associated with the received signal. The mainlobe reformer 160 will be further described with reference to FIGS. 12-15. The resampler 162 may decimate reformed frames received from the mainlobe reformer 160 to generate a "super" frame that includes modified frames of the received signal. The resampler 162 will be further described with reference to FIG. 16.

The digital signal processing system 150 may also include other conventional radar signal processing 164 components that may further process the output of the resampler 162. Other conventional processing components may exist between any of the elements of the digital signal processing system 150 of FIG. 1 that may, for example, process frames across an azimuth. Additionally or in the alternative, other conventional processing components may utilize the output at one or more of the junctions of the elements of the digital signal processing system 150. Although various implementations of the system 100, the transceiver system 110, and the digital signal processing system 150 are described herein with respect to transmitted/received radar signals, the transmission, receipt, and process of other types of signals (e.g., auditory signals, light signals such as laser signals) associated with other technical fields is also contemplated. In a non-limiting example, other implementations of the system 100 may be applied to technical fields that involve sonar signals where the transceiver system 110 may transmit and receive sonar signals that are processed by the digital signal processing system 150 to generate a sonar "super" frame that includes modified frames associated with reflected sonar signals.

II. Method for Processing a Reflected Signal

Figure 3:
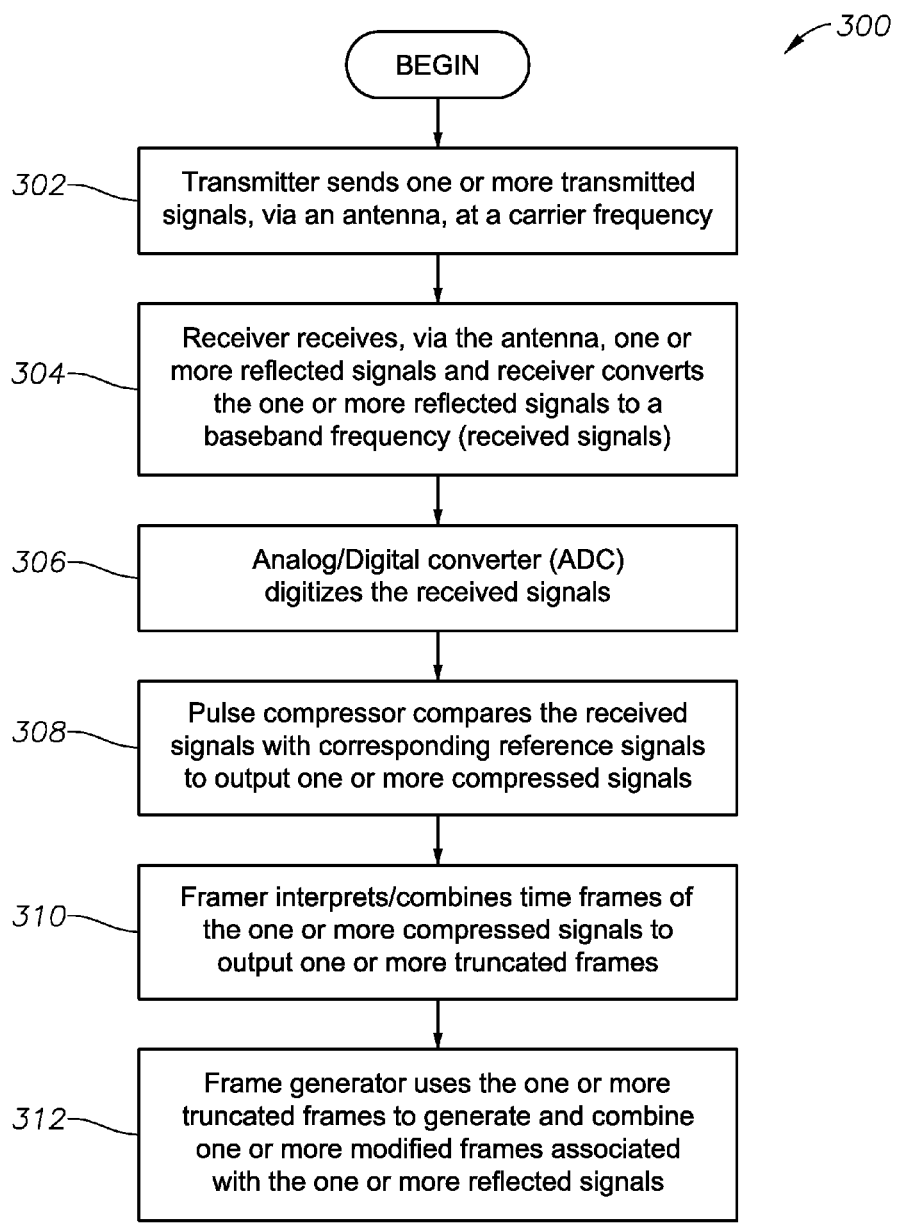
FIG. 3 illustrates a flow diagram of a method for processing one or more reflected signals in accordance with implementations of various techniques described herein.
Figure 4:
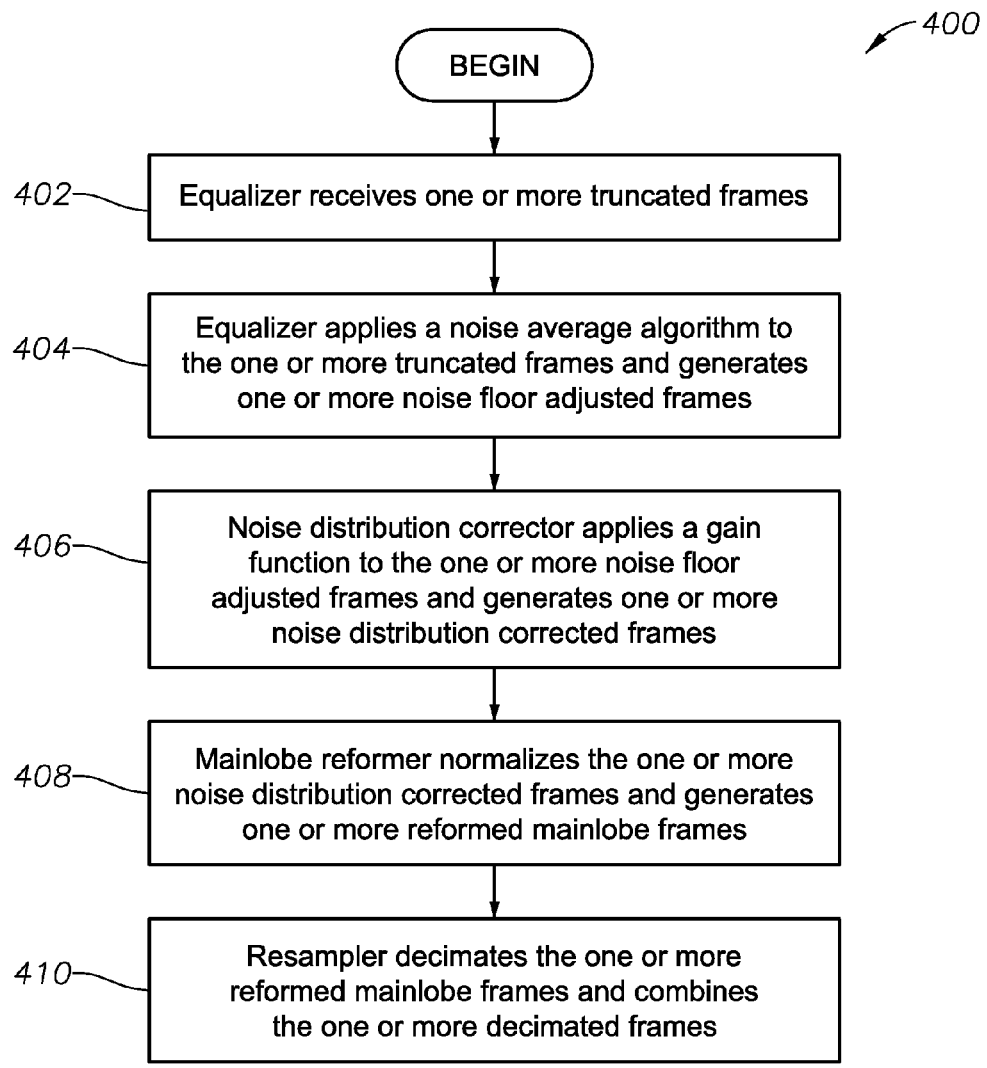
FIG. 4 illustrates a flow diagram of an additional method for processing one or more reflected signals in accordance with implementations of various techniques described herein.

FIGS. 3 and 4 are flow diagrams in accordance with techniques described herein. In general, the pulse compression radar system 100 combines received reflected signals that have varying signal and noise characteristics by (1) transmitting a signal and receiving a signal; (2) compressing and interpreting the received signal; and (3) generating and combining modified frames associated with the received signal. Transmitting a signal and receiving a signal are described at steps 302-306 in FIG. 3. Compression and interpretation of the received signal are described at steps 308-310 in FIG. 3. Generating and combining modified frames are described at step 312 of FIG. 3 and steps 402-410 of FIG. 4. It should be understood that while the methods shown in FIGS. 3 and 4 may indicate a particular order of execution of operations, in some implementations, certain portions of the operations might be executed in a different order. Further, in some implementations, additional operations or steps may be added to the methods. Likewise, some operations or steps may be omitted A. Transmitting and Receiving Signals FIG. 3 is a flow diagram in accordance with techniques described herein. At step 302, the transmitter 114 transmits one or more signals via antenna 112. For example, the transmitter 114 may transmit a burst signal, such as the burst 200 of FIG. 2. The transmitted signal may comprise 1 to N chirp signals (e.g., the chirp signals 215(1) to 215(5)). The one or more signals transmitted may be one or more burst signals. At step 304, the antenna 112 and the receiver 118 receive one or more reflected signals. For example, antenna 112 and the receiver 118 receive a reflected signal that corresponds to the transmitted burst signal. The reflected signal may comprise multiple reflected signals that correspond to the 1 to N chirp signals. The one or more reflected signals may be signals that correspond to one or more burst signals.

The receiver 118 converts the reflected signals to a baseband frequency to generate received signals. For example, the receiver 118 may receive a reflected signal (e.g., corresponding to a single burst signal) and converts the reflected signal to a baseband frequency to generate a received signal. At step 306, the ADC 120 digitizes the received signals. For example, the received signal is sent to the ADC 120 which digitizes the received signal, resulting in a digitized signal. The digitized signal may correspond to the received signal (e.g., the converted reflected signal that corresponds to a burst signal) that has been sampled. To illustrate, the reflected signal may have one more frames of reflection signals that correspond to the frames of the transmitted signal (e.g., frames 225 of FIG. 2). The ADC 120 may sample each of the one or more reflection signals that correspond to frames 225. The sampling rate may be different for each of the frames. The output of the ADC 120 may be sampled frames of a received signal that corresponds to the frames of the transmitted signal.

B. Compressing and Interpreting Received Signals

At step 308 of FIG. 3, the pulse compressor 152 compares the received signals with corresponding reference signals to output one or more compressed signals. For example, the received signal may be sent from the ADC 120 to the pulse compressor 152. The received signal may comprise sampled frames. The pulse compressor 152 may compare each sampled frame to a corresponding reference frame to generate compressed signal frames. For example, the compressed signal frames may be represented as compressed frame 1 to compressed frame N. In a particular embodiment, the pulse compressor 152 may process the frames of the received signal in a serial manner. For example, frames may be processed in a first in first out (FIFO) process. Alternatively, the pulse compressor 152 may process the frames of the received signal simultaneously in a parallel manner.

At step 310 of FIG. 3, the framer 154 interprets and/or combines time frames of the one or more compressed signals to output one or more truncated frames. For example, the framer 154 may receive each of the compressed signal frames generated by the pulse compressor 152. The framer 154 may interpret and/or combine each of the compressed signal frames to generate truncated pulse compression frames. For example, the truncated pulse compression frames may be represented as truncated pulse compression frame 1 to truncated pulse compression frame N. In a particular embodiment, the framer 154 may process the compressed signal frames in a serial manner (e.g., a FIFO process). Alternatively, the framer 154 may process compressed signal frames simultaneously in a parallel manner. For example, the framer 154 may process compressed signal frames 1 through N in the parallel manner. Aspects of the framer 154 will be further described with reference to FIG. 5.

C. Generating and Combining Modified Frames

At step 312 of FIG. 3, the frame generator 151 may use the one or more truncated frames to generate and combine one or more modified frames associated with the one or more reflected signals. For example, the frame generator 151 may receive each of the truncated pulse compression frames generated by the framer 154. The frame generator 151 may process each of the truncated pulse compression frames to generate modified frames corresponding to each of the truncated pulse compression frames. For example, the modified frames may be represented as modified frame 1 to modified frame N. The frame generator 151 may combine the modified frames to generate a "super" frame that corresponds to the received signal (e.g., the received signal associated with the reflected signal). In a particular embodiment, the frame generator 151 may process each of the truncated pulse compression frames in a serial manner (e.g., a FIFO process). Alternatively, the frame generator 151 may process the truncated pulse compression frames simultaneously in a parallel manner. For example, the frame generator 151 may process truncated pulse compression 1 through N in the parallel manner.

The frame generator 151 may perform additional processing steps as part of generating and combining modified frames to generate the "super" frame that corresponds to the received signal. The additional processing steps may be associated with the noise floor equalizer 156, the noise distribution corrector 158, the mainlobe reformer 160, and the resampler 162. The additional processing steps may include, but are not limited to, the steps that are described with reference to FIG. 4.

At step 402 of FIG. 4, the noise floor equalizer 156 receives the one or more truncated frames from by the framer 154. For example, the noise floor equalizer 156 may receive each of the truncated pulse compression frames generated by the framer 154. In a particular embodiment, the noise floor equalizer 156 may receive each of the truncated pulse compression frames in a serial manner (e.g., a FIFO process). Alternatively, the noise floor equalizer 156 may receive the truncated pulse compression frames simultaneously in a parallel manner.

At step 404 of FIG. 4, the noise floor equalizer 156 applies a noise average to the one or more truncated frames and generates one or more noise floor adjusted frames. For example, the noise floor equalizer 156 may apply a noise average to each of the received truncated pulse compression frames to generate corresponding noise floor adjusted frames. For example, the noise floor adjusted frames may be represented as noise floor adjusted frames 1 to N. The applied noise average may include an initial noise average as determined by a baseline method. Additionally or in the alternative, the applied noise average may include an updated noise average as determined by a maintenance method. Determination of the applied noise average will be further described with reference to FIGS. 7-8. In a particular implementation, the noise floor equalizer 156 may process the truncated pulse compression frames in a serial manner (e.g., a FIFO process). Alternatively, the noise floor equalizer 156 may process the truncated pulse compression frames simultaneously in a parallel manner. Aspects of the noise floor equalizer 156 will be further described with reference to FIG. 6.

At step 406 of FIG. 4, the noise distribution corrector 158 applies a gain function to the one or more noise floor adjusted frames and generates one or more noise distribution corrected frames. For example, the noise distribution corrector 158 may apply a gain function to each of the received noise floor adjusted frames to generate corresponding noise distribution corrected frames. For example, the noise distribution corrected frames may be represented as noise distribution corrected frames 1 to N. In a particular embodiment, the noise distribution corrector 158 may process the noise floor adjusted frames in a serial manner (e.g., a FIFO process). Alternatively, the noise distribution corrector 158 may process the noise floor adjusted frames simultaneously in a parallel manner. Aspects of the noise distribution corrector 158 will be further described with reference to FIGS. 9-11.

At step 408 of FIG. 4, the mainlobe reformer 160 normalizes the one or more noise distribution corrected frames and generates one or more reformed mainlobe frames. For example, the mainlobe reformer 160 may normalize mainlobes of each of the received noise distribution corrected frames to generate corresponding reformed mainlobe frames. For example, the reformed mainlobe frames may be represented as reformed mainlobe frames 1 to N. In a particular embodiment, mainlobe reformer 160 may process the noise corrected frames in a serial manner (e.g., a FIFO process). Alternatively, the mainlobe reformer 160 may process the noise distribution corrected frames simultaneously in a parallel manner. Aspects of the mainlobe reformer 160 will be further described with reference to FIGS. 12-15.

At step 410 of FIG. 4, the resampler 162 decimates the one or more reformed mainlobe frames and combines the one or more decimated frames. For example, the resampler 162 may decimate each of the received reformed mainlobe frames and may combine the resulting decimated frames. For example, the decimated frames may be represented as decimated frames 1 to N. In a particular embodiment, resampler 162 may process the reformed mainlobe frames in a serial manner (e.g., a FIFO process). Alternatively, the resampler 162 may process the reformed mainlobe frames simultaneously in a parallel manner. Aspects of the resampler 162 will be further described with reference to FIG. 16.

III. Framer

Figure 5:
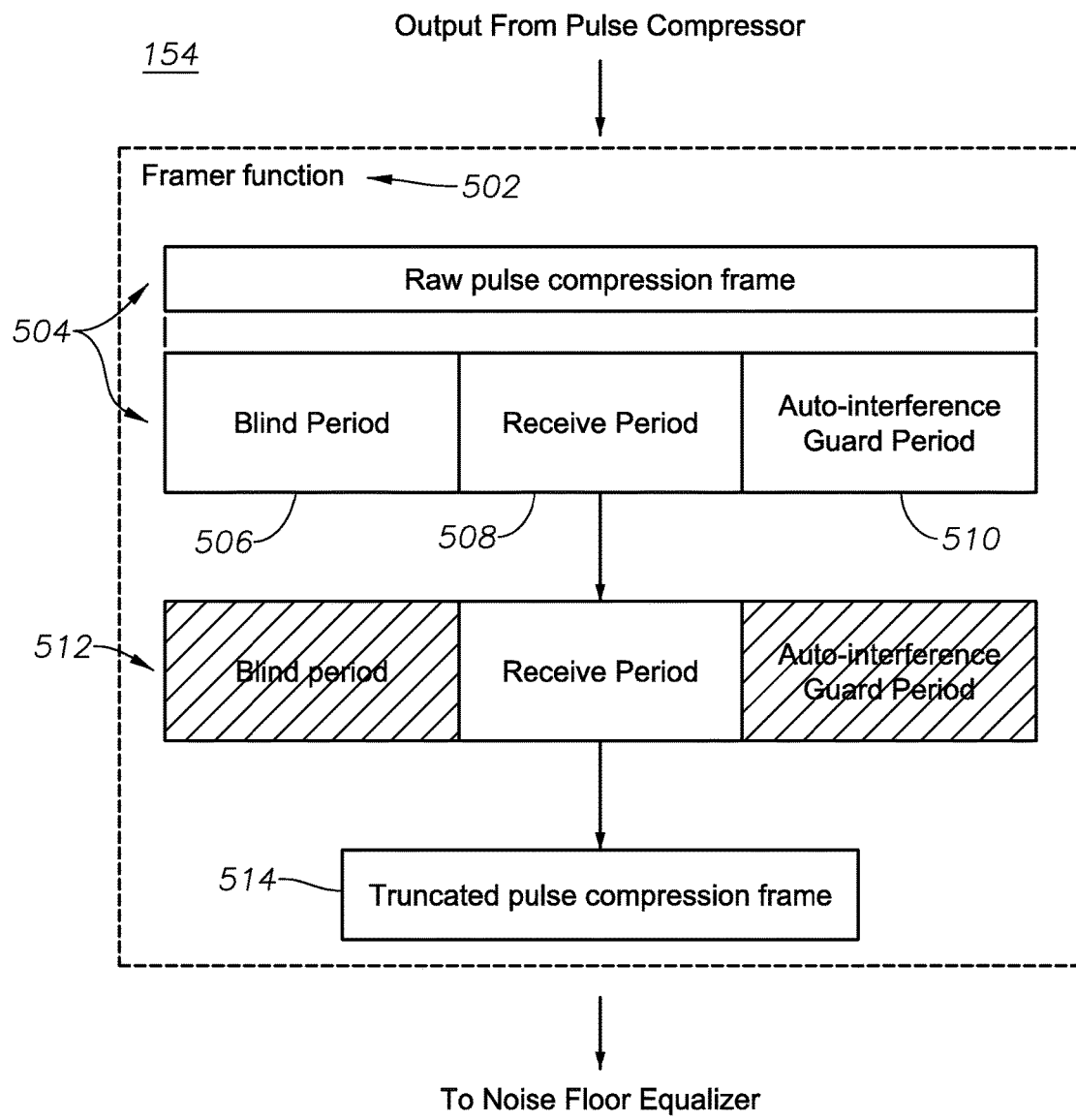
FIG. 5 illustrates a block diagram of a framer in accordance with implementations of various techniques described herein.

Various aspects and methods of the framer 154 are illustrated in FIG. 5. Referring to step 310 of FIG. 3, the framer 154 may interpret and/or combine time frames (e.g., time frames 225) of the one or more compressed signals to output one or more truncated frames. For example, the framer 154 may receive a pulse compression frame 504 (e.g., a compressed frame corresponding to a time frame such as time frame 215(1) of FIG. 2) from the pulse compressor 152. The pulse compression frame 504 may include one or more portions such as a blind period 506, a receive period 508, and an auto-interference guard period 510. The blind period 506 may correspond to a transmission period (e.g., the period(s) 215 of FIG. 2). The framer 154 may utilize a framer function 502 to interpret the pulse compression frame 504 for determining the portions of the pulse compression frame 504. The framer function 502 may include targeting one or more portions of the pulse compression frame 504 for removal from the pulse compression frame 504. For example, the pulse compression frame 504 may be isolated to just the receive period 508, as illustrated at 512 (e.g., the blind period 506 and the auto-interference guard period 510 portions are depicted with a diagonal hatch pattern to indicate receive period 508 isolation). The framer function 502 may include truncating the pulse compression frame 504 to form a truncated pulse compression frame 514. In another embodiment, data associated with the auto-interference guard period 510 may be truncated prior to pulse compression of the received signal by the pulse compressor 152. Truncating the compression frames in this manner may provide for a reduction in processing load for processes downstream of the framer 154. The framer 154 may apply the framer function 502 to one or more compressed signal frames (e.g., pulse compression frame 504) to output one or more truncated pulse compression frames in a serial manner. Alternatively, the framer function 502 may be applied in parallel to compressed signal frames and the resulting truncated pulse compression frames may be combined by the framer 154 to output a set of truncated frames.

IV. Noise Floor Equalizer

The truncated pulse compression frame (e.g., truncated frame 514) of the framer 154 may be sent to the noise floor equalizer 156. The noise floor equalizer 156 may correct for differences in mean noise levels between time frames (e.g., time frames 225). In order to measure system noise level, bursts 200 may be generated with the transmitter 114 disabled, and with receive limiters and/or receivers 118 enabled. In such an implementation, noise of the system 100 may be captured. Further, these bursts 200 may be scheduled to occur at a high rate initially then drop to a very low rate. These bursts 200 may be exponentially averaged with continuous accumulation to create a very stable value. A magnitude of each truncated frame may then be divided by a noise average value associated with each of the truncated frames. After this correction, substantially all truncated frames processed (e.g., time frames 225 that are compressed and truncated) will have the same mean noise floor amplitude.

Figure 6:
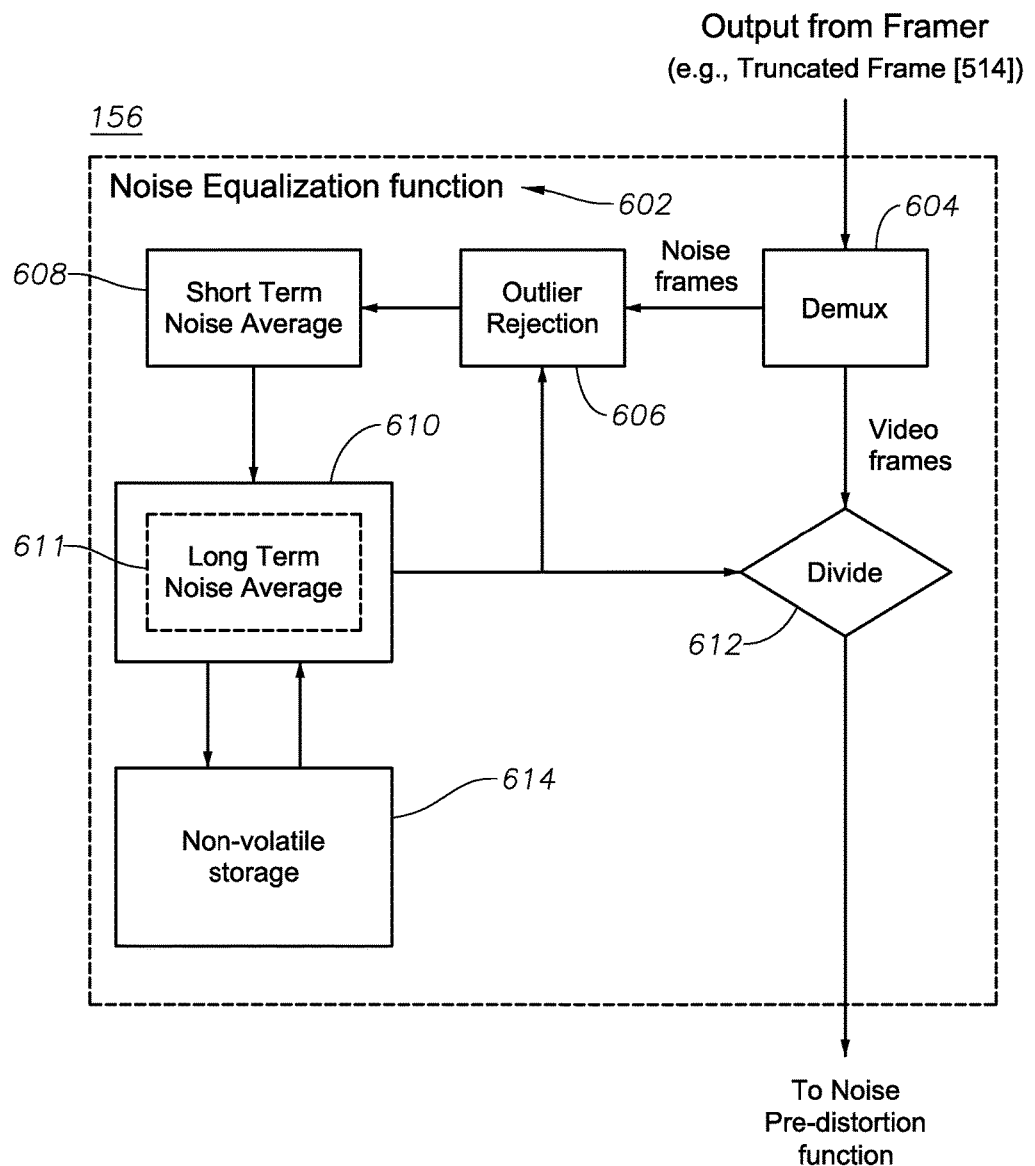
FIG. 6 illustrates a block diagram of a noise floor equalizer in accordance with implementations of various techniques described herein.

In particular, FIG. 6 illustrates aspects and methods for performing functions of the noise floor equalizer 156 in accordance with implementations of various techniques described herein. The noise floor equalizer 156 may receive a truncated pulse compression frame (e.g., the truncated frame 514) from the framer 154. The noise floor equalizer 156 may utilize a noise equalization function 602 to process the truncated frame. The noise equalization function 602 may include the operation stages illustrated in FIG. 6 and described herein.

For example, the output of the framer 154 (e.g., the truncated frame 514) may be frames with received signal information where the transmitter 114 was enabled (hereinafter referred to as video frames). Such video frames may correspond to a transmit mode of the system 100. Additionally or alternatively, the output of the framer 154 may be frames with no received signal information where the transmitter 114 was disabled (hereinafter referred to as noise frames). Such noise frames may correspond to a standby mode of the system 100. The output of the framer 154 is sent to a demultiplexing stage 604 that may determine the type of frame (e.g., a video frame or a noise frame) that is received from the framer 154. The demultiplexing stage 604 may send the video frames and the noise frames to separate processing streams. For example, if the output of the framer 154 is a video frame, the video frame is sent to a dividing stage 612 and if the output of the framer 154 is a noise frame, the noise frame is sent to an outlier rejection stage 606.

The outlier rejection stage 606 may remove contamination caused by various interferences received during the noise frame capture time. The interferences may be due to other transmitting sources such as, but not limited to, other transmitted/received radar signals. Suitable methods for the outlier rejection stage 606 may be well-known in the art. In a particular implementation, a particular noise sample of the noise frame may be compared to a long term noise average 610 for that sample. Given knowledge of the noise distribution, the amplitude of the particular noise sample can be compared to the long term noise average 611 and if sufficiently different (i.e., improbable that the sample is noise), then the sample is rejected and replaced with the long term noise average 611. In this manner, noise samples that are outliers of the system may be identified, and rejected from use in generating the long term noise average 611.

The output of the outlier rejection stage 606 is sent to a short term noise average stage 608. The short term noise average stage 608 will average a sufficient number of noise spokes such that the update rate is manageable for a non-real time process (e.g., such as a software process) to handle. Should sufficiently capable hardware be available, the short term noise average stage 608 may be combined with a long term noise average stage 610. The long term noise average 611 data may then be stored to non-volatile memory storage 614 periodically. The stored noise average from memory 614 may be used as a seed for the long term noise average 611 on a subsequent power-up or transmission of the radar.

Output frames from the framer 154 that are video frames may be sent to a dividing stage 612. The dividing stage 612 will divide the video frames by a noise average, such as the long term noise average 611. If the information of the video frame is of a log magnitude format, the long term noise average 611 may be subtracted from the video frame. The correction of video frames received from the framer 154 may result in substantially all truncated frames processed having the same mean noise floor amplitude (e.g., noise floor adjusted frames). The resulting noise floor adjusted frames may be sent to the noise distribution corrector 158.

Figure 7:
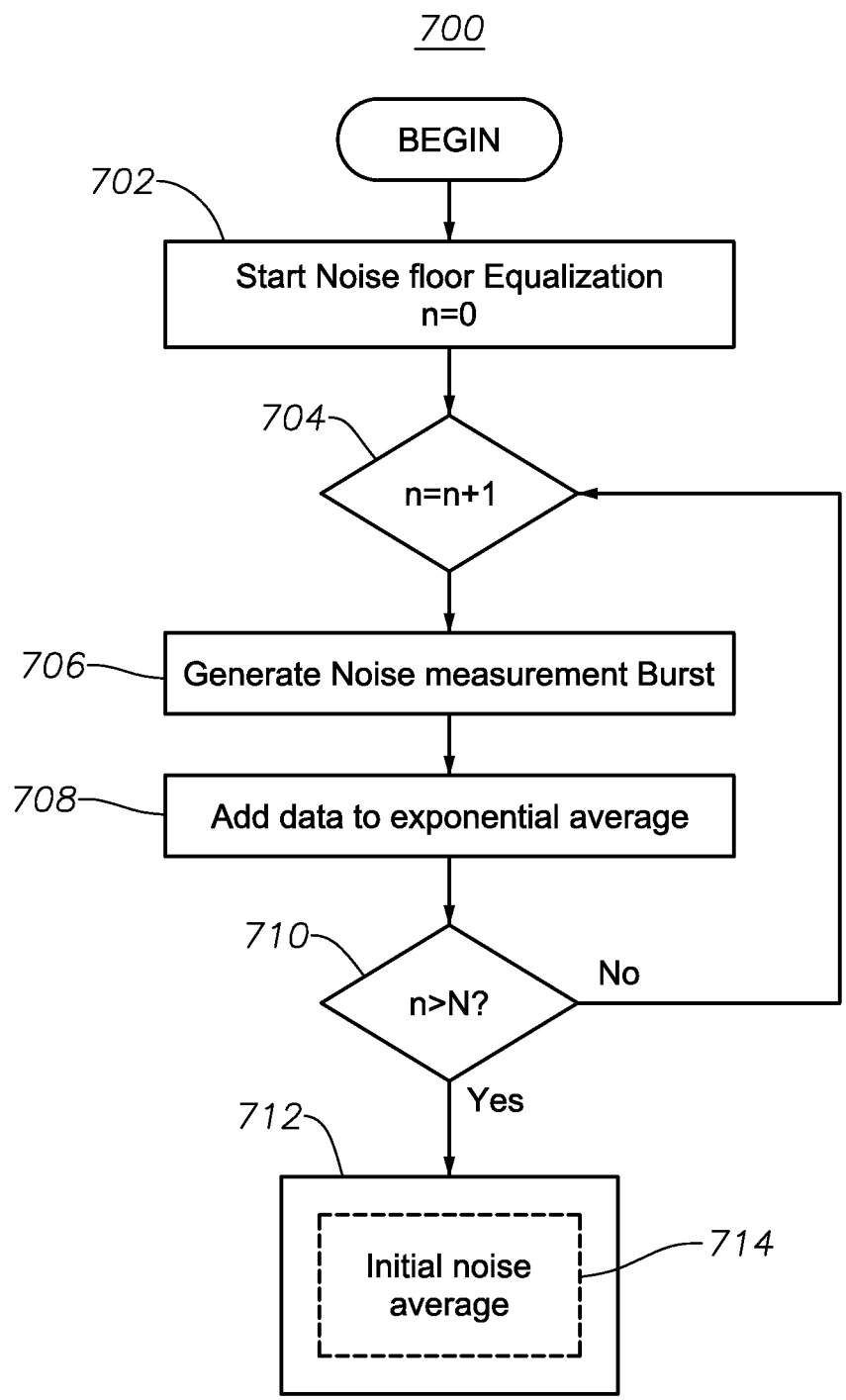
FIG. 7 illustrates a flow diagram of a method for determining an initial noise average in accordance with implementations of various techniques described herein.

The long term noise average 611 may include an initial noise average that may be determined by a baseline method, as described with reference to FIG. 7. Additionally or in the alternative, the long term noise average 611 may include an updated noise average that may be determined by a maintenance method, as described with reference to FIG. 8. FIG. 7 illustrates the baseline method 700 for initially developing the stored long term noise average 611 in accordance with implementations of various techniques described herein. The baseline method may include transmission of a long rapid series of noise measurement bursts. The noise measurement bursts may be used to transition the system 100 from a standby mode to a transmit mode. In a particular implementation, prior to a transmit mode, the baseline method may include the receiving of noise measurements of the system 100 for one or more burst periods while the transmitter 114 is temporarily disabled. The ADC 120 may sample the received noise measurements and output noise frames. The noise frames may then be processed by the pulse compressor 152, the framer 154, and the noise floor equalizer 156 for the determination of the initial noise average. The baseline method may be performed while the system 100 enters a transmit mode. For example, a noise measurement burst may be generated and then added to an exponential average for a predetermined number of iterations (e.g., "n" iterations).

As illustrated in FIG. 7, the baseline method may begin with the start of a noise floor equalization process 702 where the iteration n has an initial value of 0. At step 704, the iteration value is updated to n=n+1. At step 706, the noise measurement burst may be generated. At step 708, data of the generated noise measurement burst may be added to an exponential average. At step 710, a determination is made whether the iteration number is greater than a burst count N. If the iteration number n is not greater than the burst count N, the method returns to step 704 to increment the iteration number n and proceed with generating another noise measurement burst. If the iteration number n is greater than the burst count N, the method proceeds to step 712 to store an initial noise average 714. The stored initial noise average 714 may correspond to the long term noise average 610 of FIG. 6. In a particular implementation, N may be greater than or equal to 256. In another implementation, the burst count N may correspond to the number of frames of the burst 200.

Noise average data generated from the baseline method may be stored in non-volatile memory for use as a seed for the next time the system 100 is powered up. This technique has the advantage of speeding up convergence of the exponential average (e.g., at step 708) or may allow N to be smaller. This technique may also reduce the delay associated with achieving full transmit mode operation for the system 100.

Figure 8:
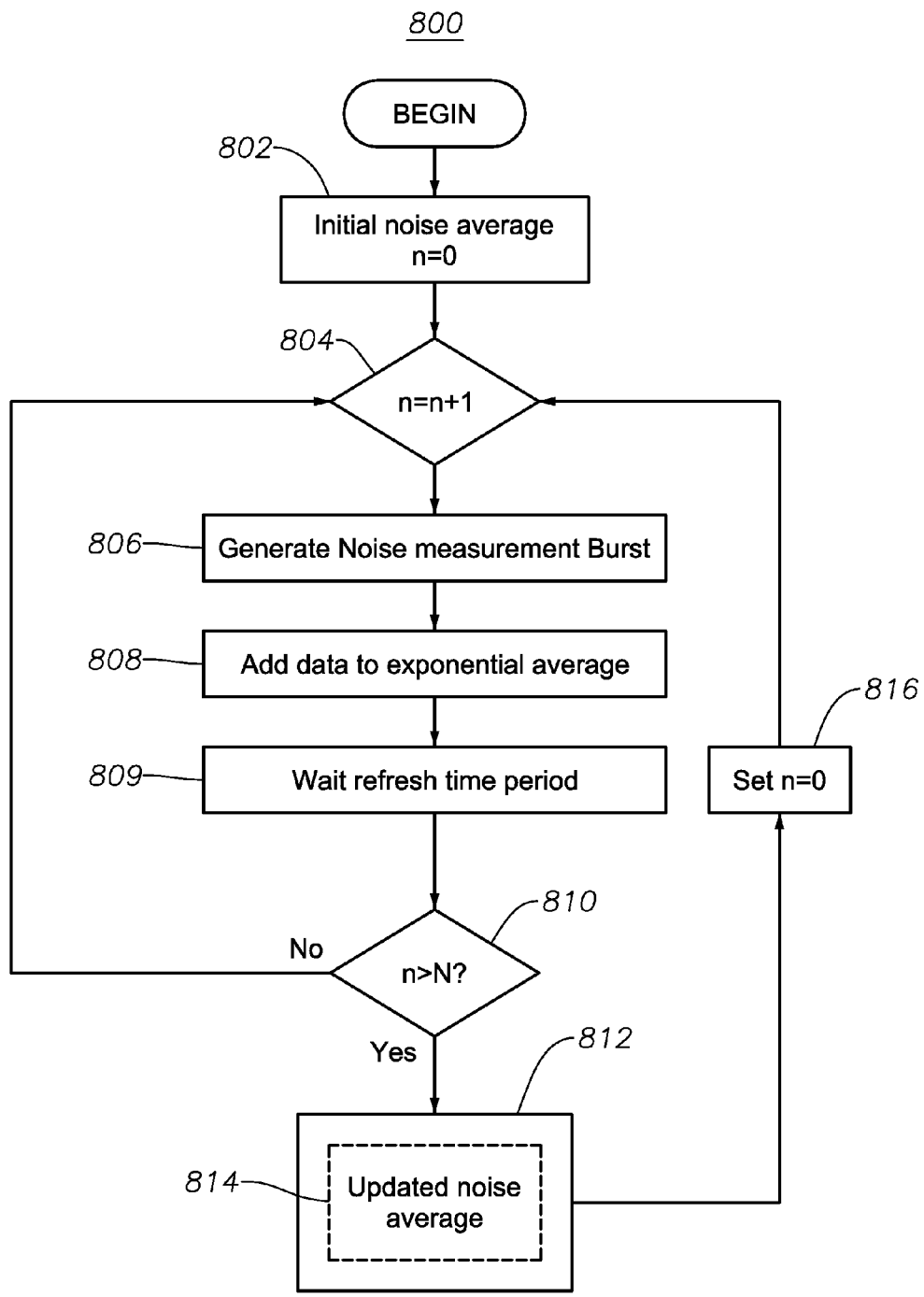
FIG. 8 illustrates a flow diagram of a method for updating a noise average in accordance with implementations of various techniques described herein.

The long term noise average 611 of FIG. 6 may include an updated noise average as determined by a maintenance method. FIG. 8 illustrates the maintenance method 800 for updating a stored noise average (e.g., the stored long term noise average 611 of FIG. 6) in accordance with implementations of various techniques described herein. The maintenance method 800 may follow the baseline method. The maintenance method 800 may be used to account for any thermal drift or aging effects of the system 100 hardware. These effects occur and change very slowly such that the rate of noise measurement bursts carried out as part of the maintenance method 800 can be very low. For example, a low rate of noise measurement burst may correspond to a burst count N that is less than 10. In a radar system (e.g., the system 100) a single noise measurement burst may be generated once every antenna rotation of the radar system. This low rate also means that a resulting radar image is not affected by the maintenance method 800.

In the maintenance method 800, a noise measurement burst may be generated, then added to an exponential average, and a refresh time period may then be allowed to elapse. The method 800 may be performed for a predetermined number of iterations (e.g., "n" iterations). In a particular implementation, as illustrated in FIG. 8, the maintenance method 800 may begin after an initial noise average has been determined at 802 where the iteration n has an initial value of 0. At step 804, the iteration value is updated to n=n+1. At step 806, the noise measurement burst may be generated. At step 808, data of the generated noise measurement burst may be added to an exponential average. At step 809, the method 800 may wait for a duration of time corresponding to a refresh time period. At step 810, a determination is made whether the iteration number is greater than a burst count N. If the iteration number n is not greater than the burst count N, the method 800 returns to step 804 to increment the iteration number n and proceed with generating another noise measurement burst. If the iteration number n is greater than the burst count N, the method 800 proceeds to apply a maintenance update at 812 to a stored noise average 814. The stored noise average 814 to be updated may correspond to the long term noise average 610 of FIG. 6. The updated stored noise average may be stored in non-volatile memory, such as the non-volatile storage 614 of FIG. 6. Upon storage of the updated stored noise average, the method 800 may reset the iteration number n to n=0 at step 816 and then return to step 804.

Returning to FIG. 6, the dividing stage 612 will divide the video frames by a noise average, such as the long term noise average 611. Correction of video frames (e.g., truncated frames with received signal information) received from the framer 154 may result in all truncated frames from the burst 200 having the same mean noise floor amplitude (e.g., noise floor adjusted frames). The resulting noise floor adjusted frames may be sent from the noise floor equalizer 156 to the noise distribution corrector 158. Aspects of the noise distribution corrector 158 will be described with reference to FIGS. 9-11.

V. Noise Distribution Corrector

Figure 9:
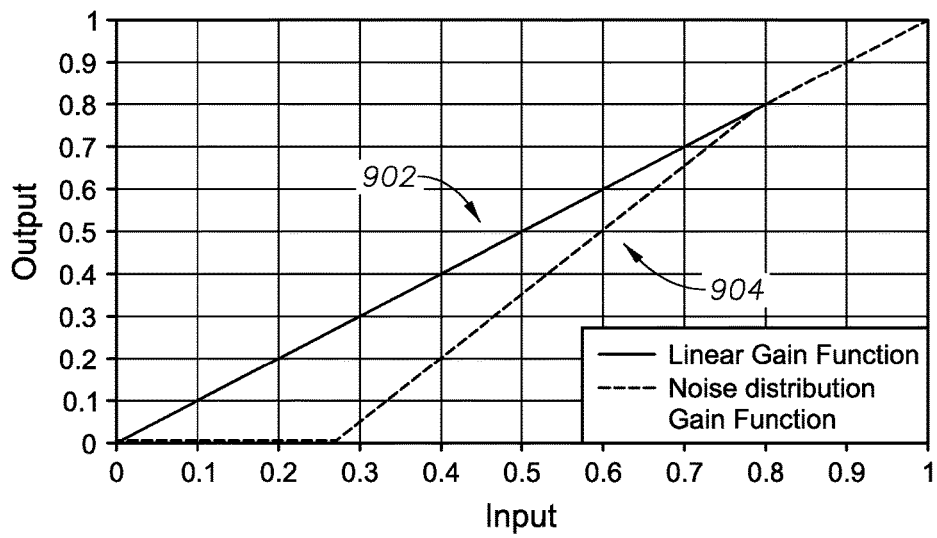
FIG. 9 is a graph of noise gain functions in accordance with implementations of various techniques described herein.

The output (e.g., noise floor adjusted frames) of the noise floor equalizer 156 may be sent to the noise distribution corrector 158. The noise distribution corrector 158 may correct for shifts in the noise distribution caused by a mainlobe reformation process described in further detail with reference to FIGS. 12-15. In particular, the noise distribution corrector 158 may correct for shifts by applying non-linear gain in the noise amplitude region. A single linear gain step may be used to perform such a shift, as shown in FIG. 9. For example, FIG. 9 shows a graphical representation of a noise distribution gain function 904 that may be used by the noise distribution corrector 158. In comparison, FIG. 9 also shows a graphical representation of a linear gain function 902. The threshold at which the gain step occurs and magnitude of the gain change may be different for each frame (e.g., each noise floor adjusted frame). In a particular implementation, the threshold value and the magnitude value will be proportional to the ratio of the lowest range resolution frame in the burst (e.g., burst 200 of FIG. 2) to the range resolution of the particular frame being processed.

Figure 10:
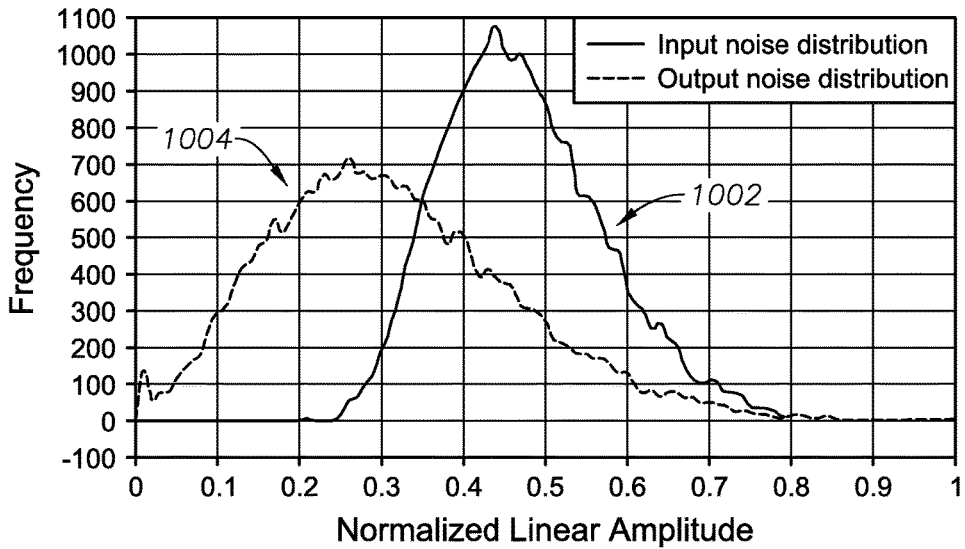
FIG. 10 is a graph of noise distributions in accordance with implementations of various techniques described herein.

Application of a gain function by the noise distribution corrector 158 may correct for shifts in the noise distribution. Such a correction may shift a noise distribution as shown in the graphical representation of FIG. 10. For example, FIG. 10 shows a graphical representation of an input noise distribution 1002 and an output noise distribution 1004 that results from the application of a gain function by the noise distribution corrector 158. The output noise distribution 1004 has been shifted relative to the noise distribution of the input 1002. The correction shift by the noise distribution corrector 158 may compensate for the noise distribution shifts caused by the mainlobe reformation process that may follow the noise distribution correction.

Figure 11:
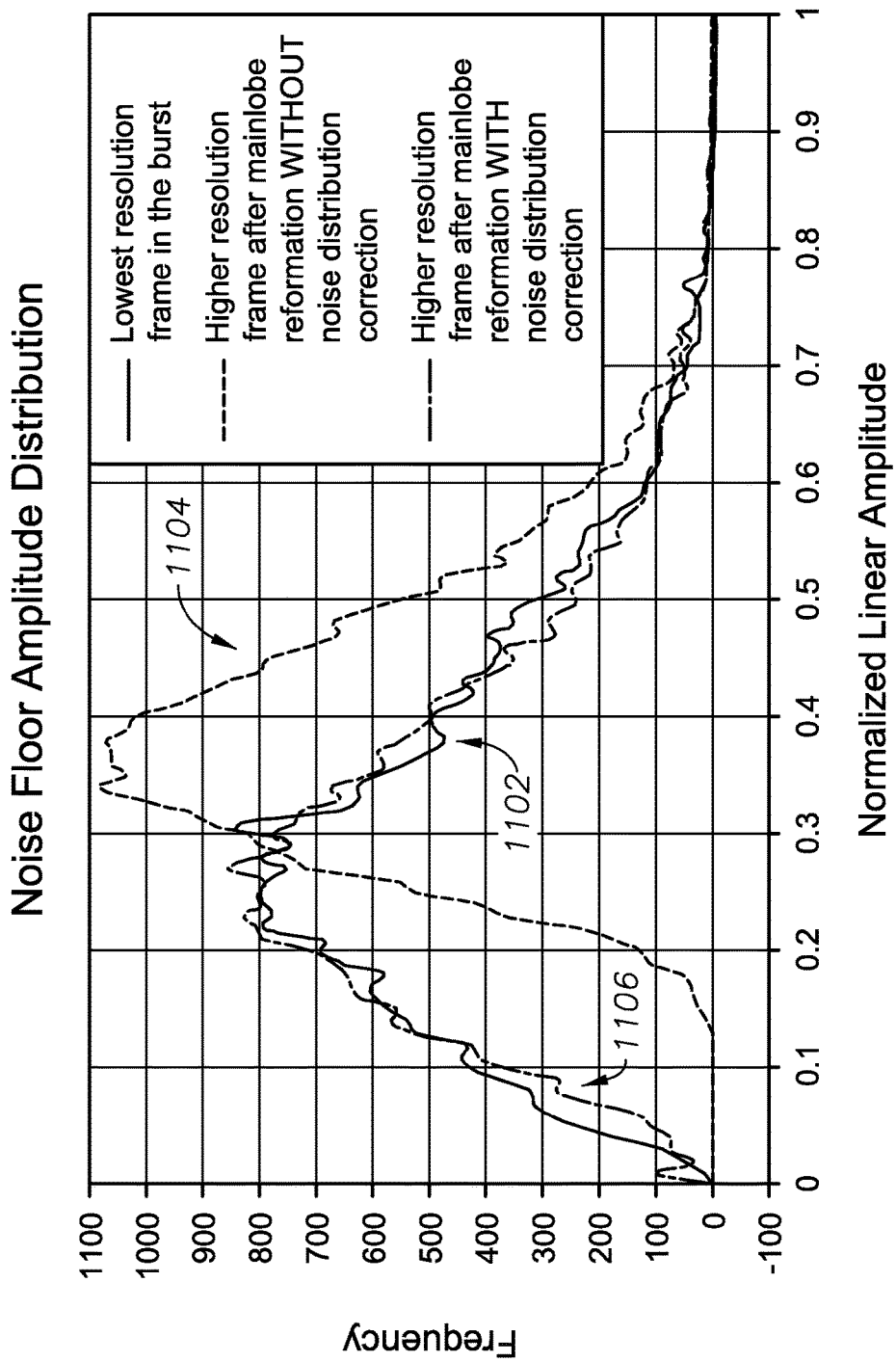
FIG. 11 is another graph of noise distributions in accordance with implementations of various techniques described herein.

The mainlobe reformer 160 may reduce range resolution and may be configured to make the resolution of all frames the same. To account for this, in a particular embodiment, the noise distribution provided by the noise distribution corrector 158 may be adjusted to match a lowest resolution frame in the burst (e.g., burst 200 of FIG. 2). For example, FIG. 11 shows a graphical representation of a noise distribution for a high resolution frame 1104 that has been mainlobe reformed but has not undergone noise distribution correction. FIG. 11 also shows a graphical representation of a noise distribution for a lowest resolution frame 1102 with no noise distribution correction. Further, FIG. 11 shows a graphical representation of a noise distribution for a high resolution frame 1106 that has been mainlobe reformed and undergone noise distribution correction. As shown in FIG. 11, the noise distribution of the high resolution frame 1106 has been shifted as a result of using the noise distribution corrector 158. The noise distribution corrector 158 enables the adjustment of the noise distribution so as to match the noise distribution of the lowest resolution frame in the burst (e.g., the low resolution frame 1102). In a particular implementation, in order to have a consistent and stable effect on the noise distribution, the noise equalization provided by the noise floor equalizer 156 may occur prior to the noise distribution correction provided by the noise distribution corrector 158.

The noise distribution corrector 158 may receive noise floor adjusted frames from the noise floor equalizer 156. The noise distribution corrector 158 may correct for shifts in the noise distribution for each received noise floor adjusted frame to generate noise distribution corrected frames. For example, the noise distribution corrected frames may be corrected frames from burst 200 such that all the frames from the burst 200 may now have the same noise distribution. The noise distribution corrected frames may be received by a mainlobe reformer 160. Aspects of the mainlobe reformer 160 will be described with reference to FIGS. 12-15.

VI. Mainlobe Reformer

The output (e.g., noise distribution corrected frames) of the noise distribution corrector 158 may be sent to the mainlobe reformer 160. The mainlobe reformer 160 may be used to account for the varying range resolution associated with chirp parameters that may be different in each frame of a burst (e.g., the burst 200 of FIG. 2). For example, when the radar is operating at long range, a burst may contain frames with range resolution that varies from 25 m to 360 m. When the radar system 100 is operating at medium to long range, the radar image may look unbalanced with point targets at shorter ranges becoming vanishing small in both range and azimuth when compared with targets farther out. In addition, across some frame boundaries, there may be large abrupt changes in range resolution that could look artificial to a user. In addition, the mainlobe reformer 160 may reduce information content of the source data prior to the use of a decimation process.

Mainlobe reformation may optimally normalize the shape of target return peaks (a peak may be hereinafter referred to as a mainlobe) to match the shape of the lowest resolution compressed chirp mainlobe in the burst (e.g., the burst 200 of FIG. 2). This may be performed using a weighted max hold process with the following mathematic function:

$$x[n] = \underset{m=-k}{\overset{m=+k}{\mathrm{MAX}}} f[m]g[n-m]$$

where g[n] may be the input signal, f[m] may be the range mainlobe function, and k may be the half-width of the mainlobe function. In a particular embodiment, the mainlobe function f[m] is the function 1302 (as shown by the graphical representation in FIG. 13) that may match a compressed chirp mainlobe of a lowest resolution chirp in the burst. Various other functions may be applicable for use depending on a type of target to be detected or a particular downstream processing capability. It should be understood that the effects of utilizing alternate functions may necessitate considerations for other functions, such as the noise distribution corrector gain function, in order to avoid any resulting irregularities in the noise floor.

Figure 12:
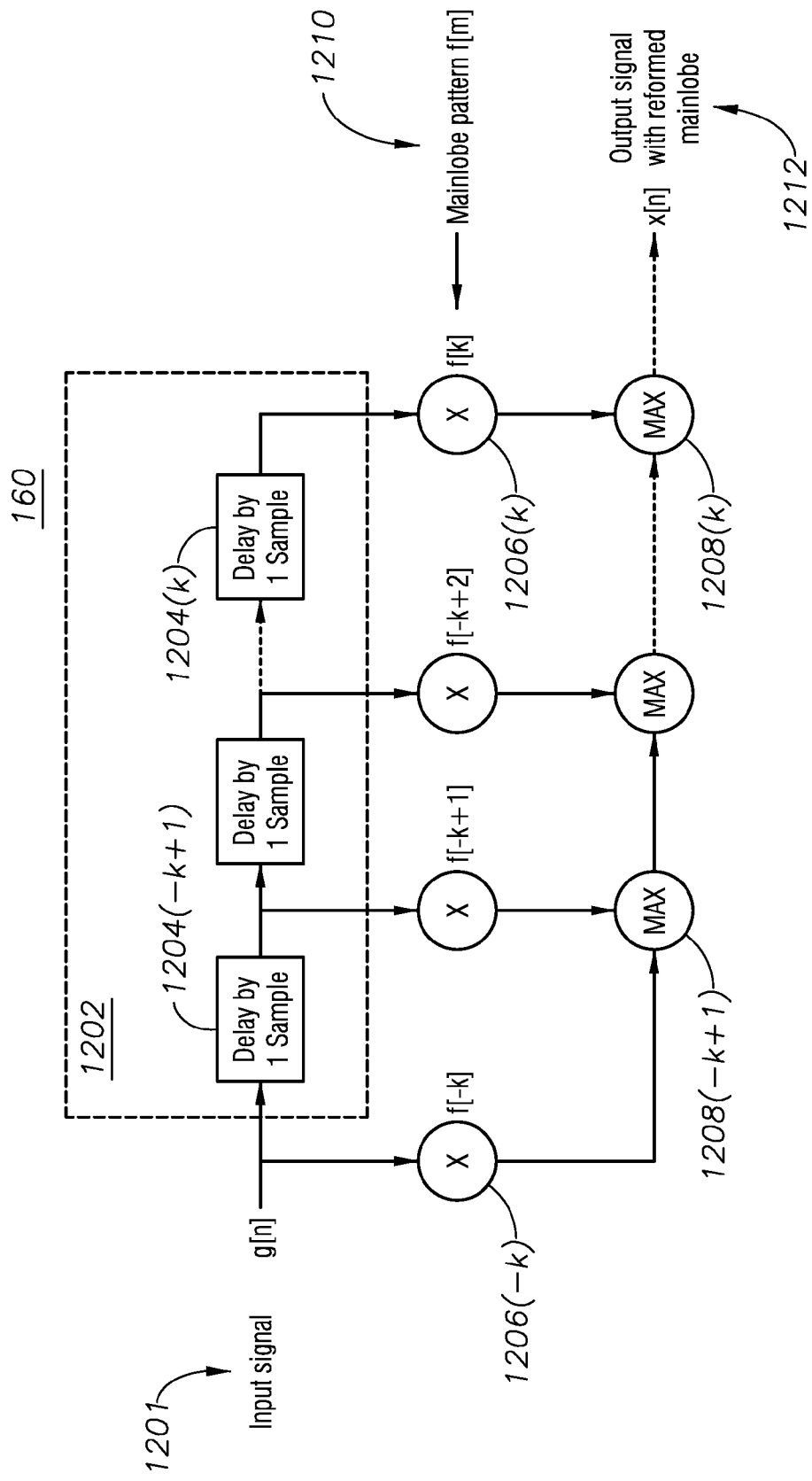
FIG. 12 illustrates a block diagram of a mainlobe reformer in accordance with implementations of various techniques described herein.
Figure 13:
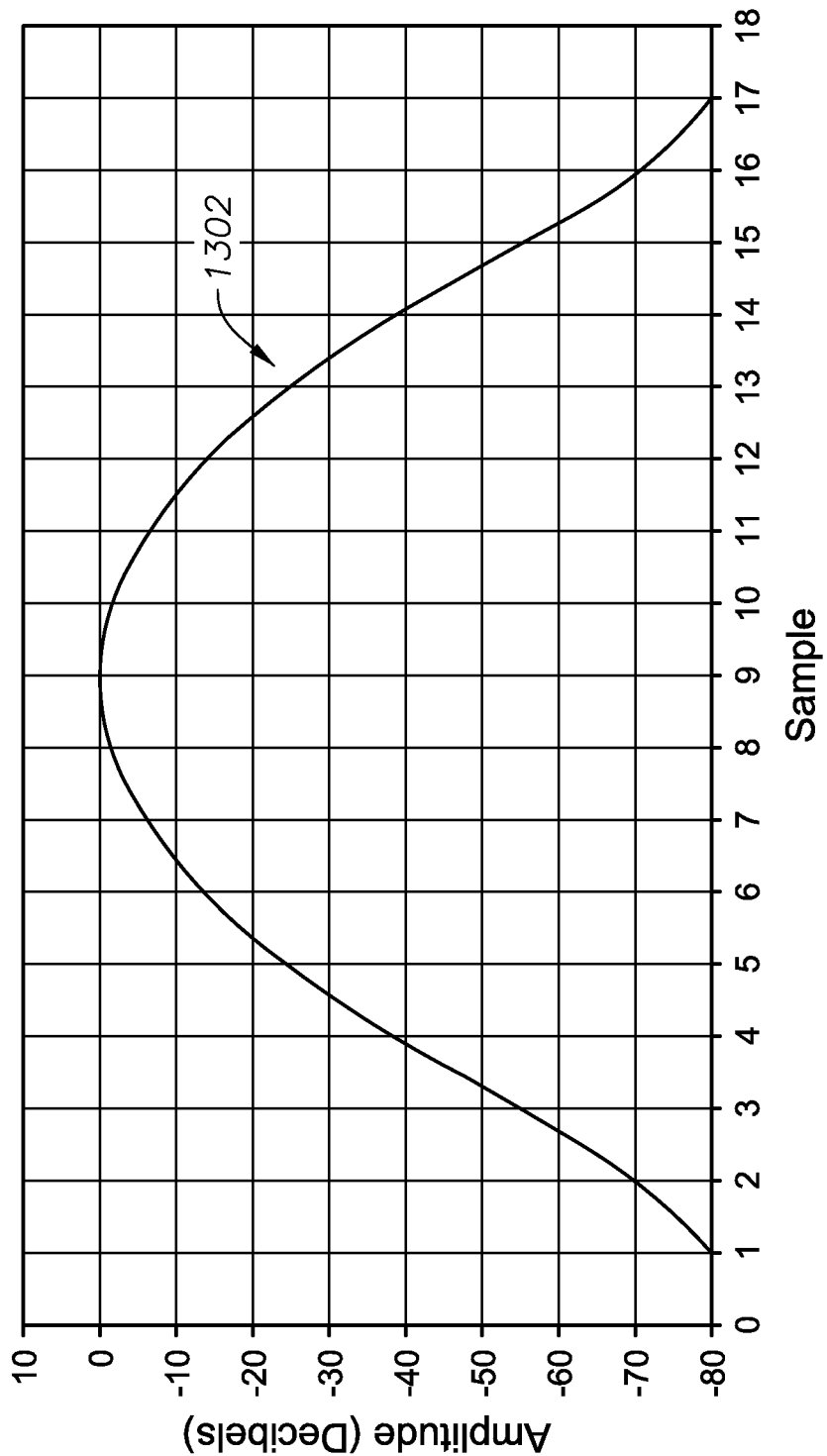
FIG. 13 is a graph of a mainlobe function in accordance with implementations of various techniques described herein.

FIG. 12 illustrates a block diagram of the mainlobe reformer 160 in accordance with various techniques described herein. The mainlobe reformer 160 receives the input signal 1201 (e.g., one or more samples of a noise distribution corrected frame sent from the noise distribution corrector 158). The input signal 1201 is a function of sample numbers. Accordingly, the input signal 1201 shall be mathematically expressed as g[n], wherein n is the sample number. The range mainlobe function 1210 may be mathematically expressed as f[m], wherein m is the sample number. The mainlobe function 1210 may be distinguished from other signal lobe functions (e.g., such as a sidelobe envelope function).

The mainlobe reformer 160 includes a 2k+1 multipliers 1206(−k) . . . 1206(k), a shift register 1202 with 2k shift units 1204(−k+1) . . . 1204(k), and 2k maximum comparators 1208(−k+1) . . . 1208(k). The mainlobe reformer 160 receives samples of the input signal 1201 at the multiplier 1206(−k) and shift unit 1204(−k+1). The shift register 1202 shifts in consecutive samples of the input signal 1201, g[n+k] . . . g[n−k].

The maximum comparators 1208(−k+1) . . . 1208(k) receive the outputs of the multipliers 1206(−k+2) . . . 1206(k−1) and maximum comparators 1208(−k+1) . . . 1208(k−1). The multiplier 1206(−k+1) receives the most recent input signal 1201 sample. The maximum comparator 1208(k) stores maximum value of g[n+k]f[−k] g[n−2k−1]*f[k]. After each shift, (1) the mainlobe reformer 160 receives the next most recent sample of the input signal 1201, e.g., g[n+1], each shift unit 1204(−k+1) . . . 1204(k−1); (2) provides its output to the next successive shift unit 1204(−k+2) . . . 1204(k), respectively; and (3) the maximum comparator 1208(k) provides the next sample of the reformed mainlobe signal 1212, x[n].

Figure 14:
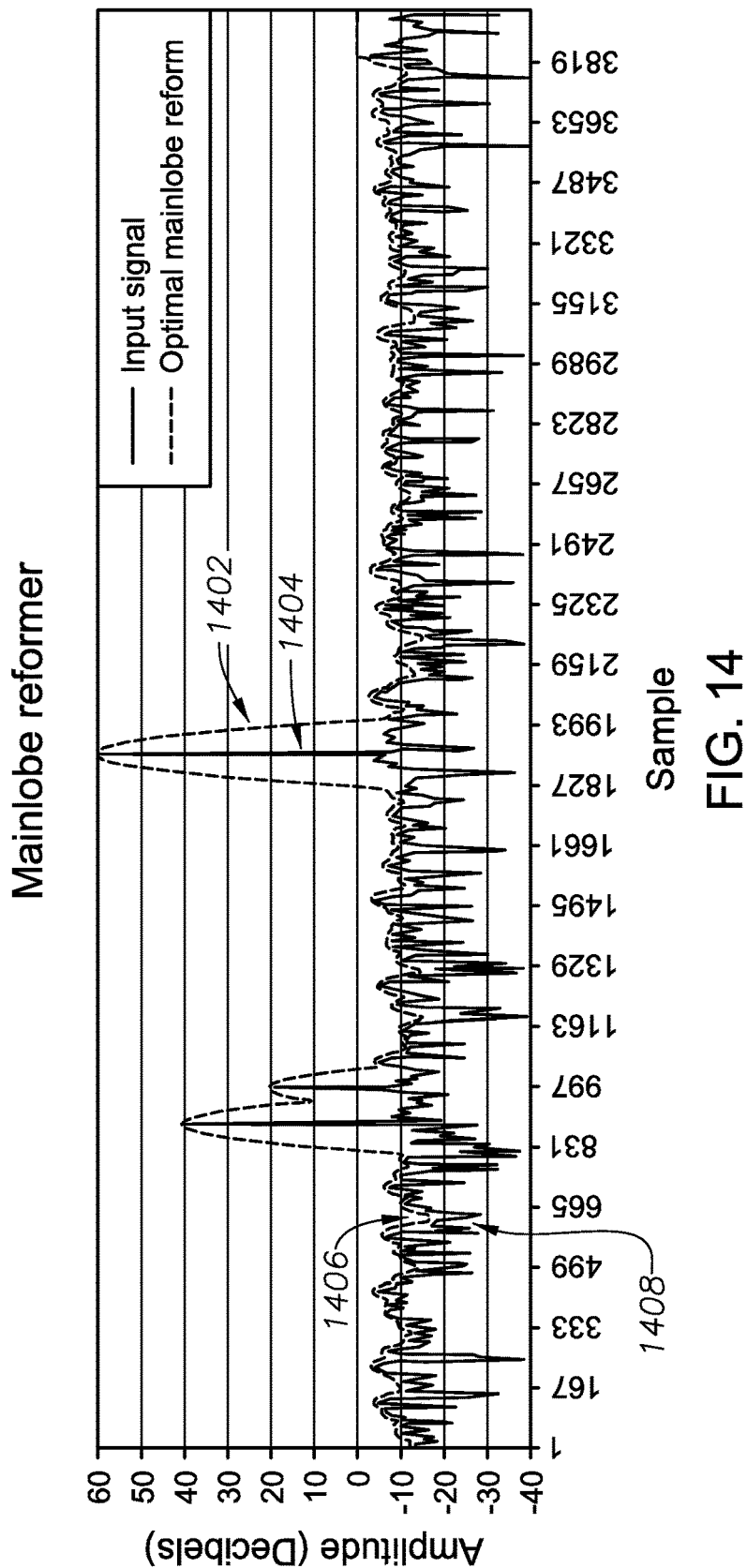
FIG. 14 is a graph of mainlobe reformation of samples of an input signal in accordance with implementations of various techniques described herein.
Figure 15:
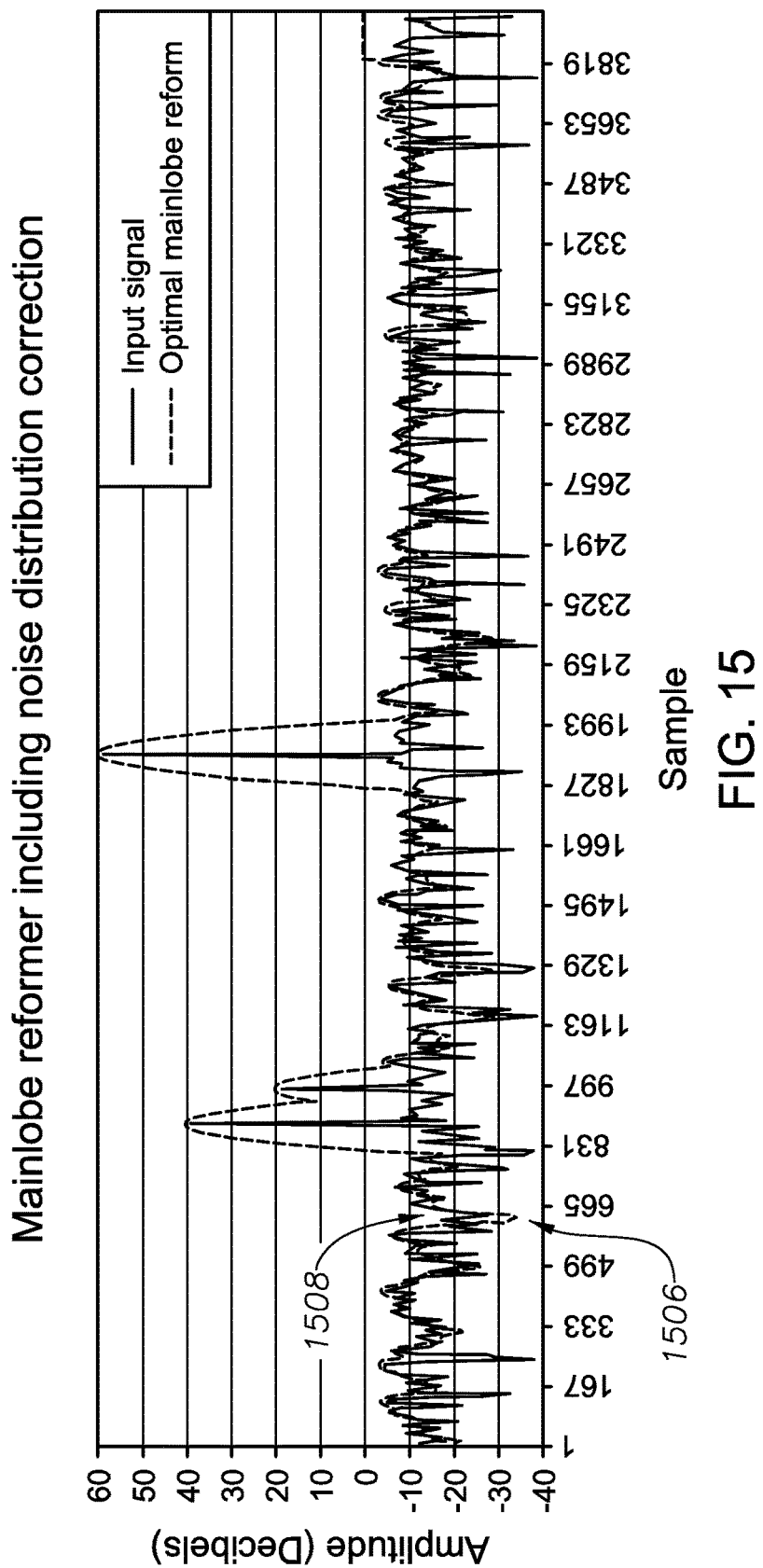
FIG. 15 is another graph of mainlobe reformation of samples of an input signal in accordance with implementations of various techniques described herein.

FIG. 14 shows a plot of optimal mainlobe reformation of an input signal by the mainlobe reformer 160. Samples of an input signal are plotted by their amplitude as shown in FIG. 14. For example, samples 1404 and 1408 of the input signal are shown in the graphical representation of FIG. 14. Samples of the input signal plotted in FIG. 14 may correspond to samples of a particular frame, such as a particular noise distribution corrected frame generated by the noise distribution corrector 158. The number of samples of the input may be directly related to a range distance in meters. For example, a range of zero meters may correspond to a first sample (e.g., approximately sample 1) and a longest range received may correspond to last sample of the frame (e.g., approximately sample 3819). Mainlobe reformation of input samples may result in the reforming of mainlobes (e.g., sample "spikes") to generate an output signal of reformed mainlobes, as shown in FIG. 14. For example, input samples 1404 and 1408 may undergo reformation to generate output signal reformed mainlobes 1402 and 1406, respectively. Mainlobe reformation may result in the narrow peaks of the input signal to be reformed into wider shaped peaks, as shown in FIGS. 14 and 15. Additionally, mainlobe reformation may also result in the noise floor (e.g., the negative going noise) being greatly reduced. This reduction may distort the noise distribution associated with the sample. For example, the amplitude of input sample 1408 may be reduced to the amplitude of the corresponding output sample 1406. To account for this noise floor effect, the noise distribution corrector 158 may correct for this effect as shown in the graphical representation of FIG. 15.

FIG. 15 shows a plot of mainlobe reformation of an input signal that includes noise distribution correction. Samples of an input signal are plotted by their amplitude as shown in FIG. 15. For example, a sample 1508 of the input signal is shown in the graphical representation of FIG. 15. Mainlobe reformation of input samples that have undergone noise distribution correction may experience less of a reduction in noise floor (e.g., the negative going noise) resulting from the mainlobe reformation process. For example, noise distribution corrected input sample 1508 may undergo mainlobe reformation to generate output signal reformed mainlobe 1506. As is shown in FIG. 15, the negative amplitude (e.g., the negative going noise) of reformed mainlobe 1506 is less reduced (e.g., a larger negative value) when compared to the corresponding output sample 1406 that resulted from main lobe reformation of an input sample having no noise distribution correction. In this manner, the noise distribution corrector 158 may account for this noise floor effect to enable less of a reduction in the noise floor of the output resulting from the mainlobe reformation process.

The mainlobe reformation as described above may extend half of the mainlobe width beyond the start and end of a frame. A maximum may be taken of the overlapping samples between frames to create a seamless join at the frame boundary. Use of a weighted max-hold process may provide processing advantages over the use of a non-weighted max hold process. For example, use of a weighted max-hold process may enable the shape of the mainlobe to be arbitrarily controlled so as to match an unreformed mainlobe profile of the frame with the lowest resolution. Additionally, use of a weighted max-hold process may enable the noise floor amplitude distribution to be significantly less compressed and requiring less noise distribution correction. This may result in the accuracy of the noise distribution correction process to be less critical.

The mainlobe reformer 160 may process the noise distribution corrected frames generated by the noise distribution corrector 158 to generate reformed mainlobe frames. For example, the reformed mainlobe frames may be represented as reformed mainlobe frames 1 to N. Each of the reformed mainlobe frames may contain mainlobe reformed signal samples. The output of the mainlobe reformer 160 may be sent to the resampler 162. For example, the resampler 162 may receive reformed mainlobe frames for further processing as described with reference to FIG. 16.

VII. Resampler

Figure 16:
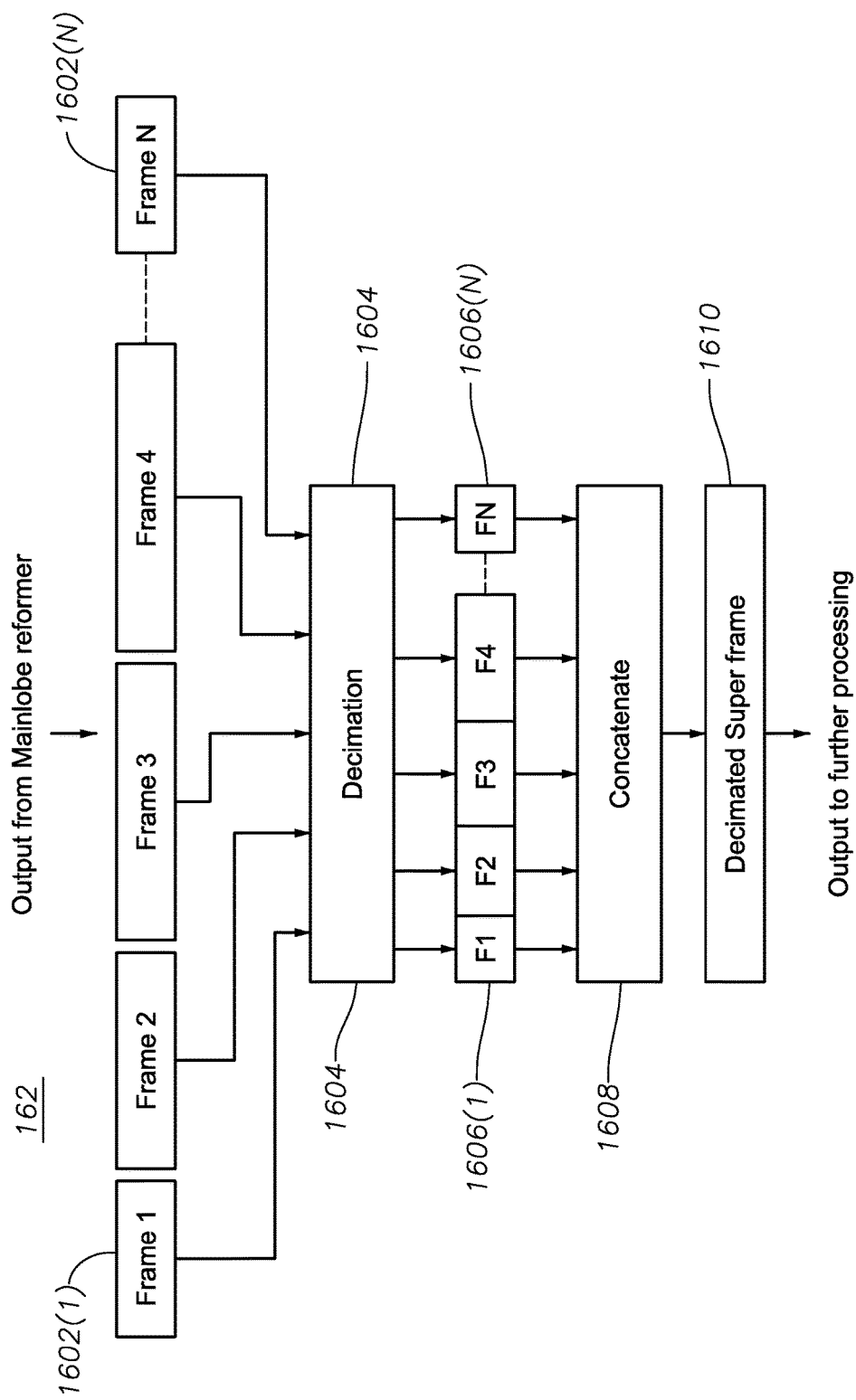
FIG. 16 illustrates a block diagram of a resampler in accordance with implementations of various techniques described herein.

Referring to FIG. 16, the resampler 162 may receive an output from the mainlobe reformer 160. For example, the resampler 162 may receive Frame 1 1602(1) to Frame N 1602(N) (e.g., mainlobe reformed frames). The resampler 162 may perform a decimation operation 1604 on Frames 1 to N (e.g., 1602(1) to 1602(N)) where decimation of the frames is done in a parallel manner. The resampler 162 may decimate the number of range samples to a number feasible for downstream processing. In one implementation, the decimation ratio may vary between 1 to 16 depending on the radar range in use. The output samples in a spoke may be made constant and, for example, 512 samples may be used. The decimation 1604 of the frames may result in decimated (i.e., reduced samples) frames 1606(1) to 1606(N). The decimated frames 1606(1) to 1606(N) may be a set of frames with various lengths in terms of the number of samples within a frame. The resampler 162 may concatenate 1608 the decimated frames 1606(1) to 1606(N) to create a decimated super-frame 1610. The decimated super-frame 1610 may be output from the resampler 162 to other downstream components associate with further signal processing 164. In an alternate implementation, Frames 1 to N (e.g., 1602(1) to 1602(N)) may be first concatenated to form a super-frame and then each frame of the super frame may be decimated individually to create the decimated super-frame 1610 to be output for further signal processing.

VIII. Further Signal Processing

The output of the resampler 162 may be sent to further radar signal processing 164. Such signal processing may include one or more components known to those skilled in the art.

In sum, the pulse compression radar system 100 may be used to transmit and receive radar signals, such that the time frames 225 of the received signal may be combined when determining a time delay between the transmitted and received signals. Such a time delay may be used to determine a distance of one or more objects in the area proximate to the radar system 100. Additionally, the pulse compression radar system 100 may be used to combine frames of radar data from multiple chirp transmissions that have different signal and noise characteristics associated with reflected signals. Such a combination may enable the generation of an image associated with reflected signals (e.g., a radar image) where characteristics of the image do not vary across a range. Further, the combining of differing frames provided by the system 100 may enable the processing of signal data that may be prohibitively too large for particular applications (e.g., recreational marine applications).

IX. Computer-Readable Media

Figure 17:
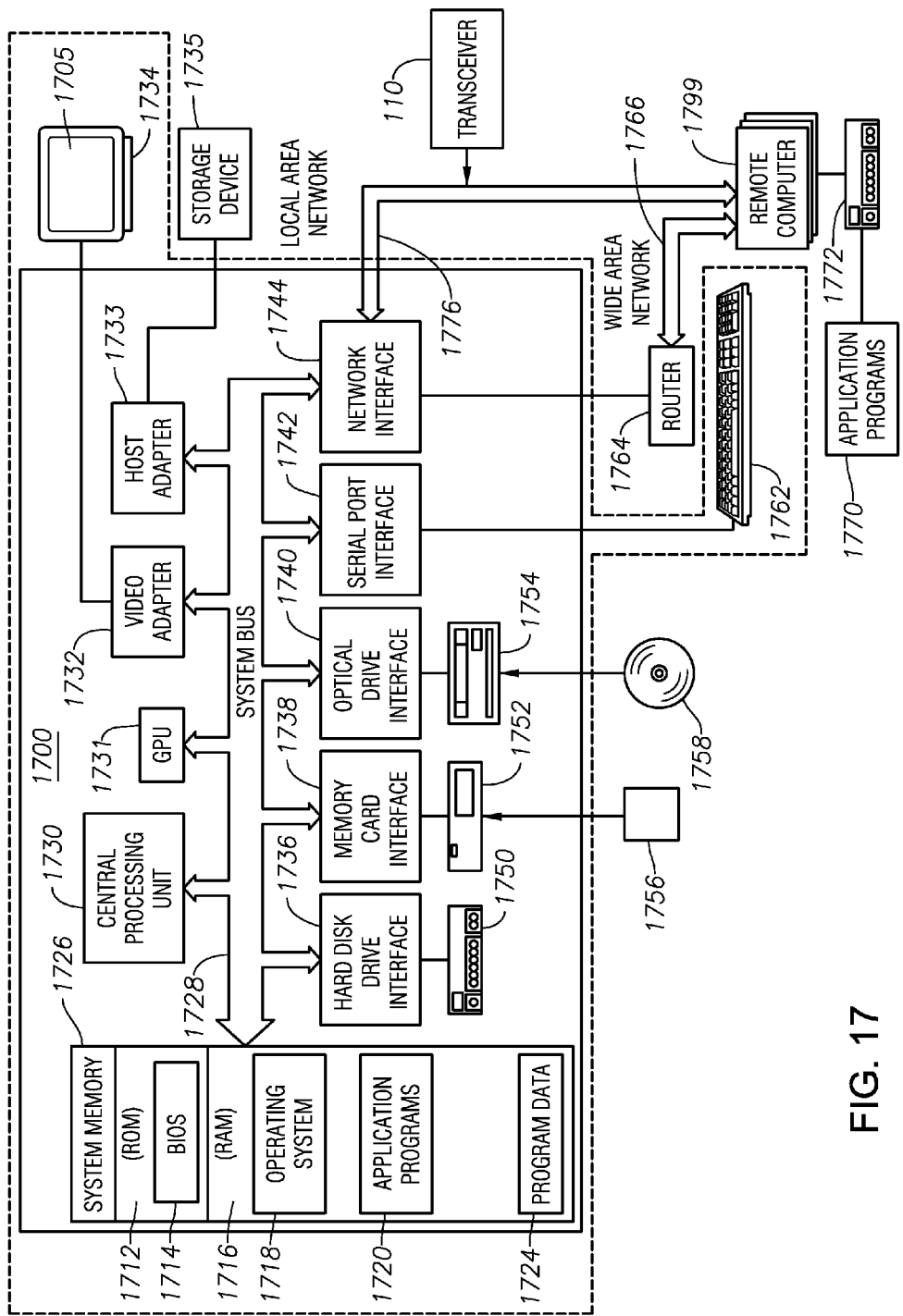
FIG. 17 illustrates a block diagram of a computer system in accordance with implementations of various techniques described herein.

FIG. 17 illustrates a computing system 1700 in accordance with implementations of various techniques described herein. The computing system 1700 may include a central processing unit (CPU) 1730, a system memory 1726, a graphics processing unit (GPU) 1731 and a system bus 1728 that couples various system components including the system memory 1726 to the CPU 1730. Although only one CPU 1730 is illustrated in FIG. 17, it should be understood that in some implementations the computing system 1700 may include more than one CPU 1730. It should be further understood that in some implementations the computing system 1700 may include other processing units or processing systems. For example, the computing system 1700 may include the digital signal processing system 150 (not shown in FIG. 17).

The CPU 1730 may include a microprocessor, a microcontroller, a processor, a programmable integrated circuit, or a combination thereof. The CPU 1730 can comprise an off-the-shelf processor such as a Reduced Instruction Set Computer (RISC), or a Microprocessor without Interlocked Pipeline Stages (MIPS) processor, or a combination thereof. The CPU 1730 may also include a proprietary processor.

The GPU 1731 may be a microprocessor specifically designed to manipulate and implement computer graphics. The CPU 1730 may offload work to the GPU 1731. The GPU 1731 may have its own graphics memory, and/or may have access to a portion of the system memory 1726. As with the CPU 1730, the GPU 1731 may include one or more processing units, and each processing unit may include one or more cores.

The CPU 1730 may provide output data to a GPU 1731. The GPU 1731 may generate graphical user interfaces that present the output data. The GPU 1731 may also provide objects, such as menus, in the graphical user interface. A user may provide inputs by interacting with the objects. The GPU 1731 may receive the inputs from interaction with the objects and provide the inputs to the CPU 1730. A video adapter 1732 may be provided to convert graphical data into signals for a monitor 1734. The monitor 1734 includes a screen 1705. In certain implementations, the screen 1705 may be sensitive to touching by a finger. In other implementations, the screen 1705 may be sensitive to the body heat from the finger, a stylus, or responsive to a mouse.

The system bus 1728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1726 may include a read only memory (ROM) 1712 and a random access memory (RAM) 1716. A basic input/output system (BIOS) 1714, containing the basic routines that help transfer information between elements within the computing system 1700, such as during start-up, may be stored in the ROM 1712.

The computing system 1700 may further include a hard disk drive interface 1736 for reading from and writing to a hard disk 1750, a memory card reader 1752 for reading from and writing to a removable memory card 1756, and an optical disk drive 1754 for reading from and writing to a removable optical disk 1758, such as a CD ROM or other optical media. The hard disk 1750, the memory card reader 1752, and the optical disk drive 1754 may be connected to the system bus 1728 by a hard disk drive interface 1736, a memory card reader interface 1738, and an optical drive interface 1740, respectively. The drives and their associated computer-readable media may provide nonvolatile storage of computer-readable instructions, data structures, program modules and other data for the computing system 1700.

Although the computing system 1700 is described herein as having a hard disk, a removable memory card 1756 and a removable optical disk 1758, it should be appreciated by those skilled in the art that the computing system 1700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1700. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1700 may also include a host adapter 1733 that connects to a storage device 1735 via a small computer system interface (SCSI) bus, a Fiber Channel bus, an eSATA bus, or using any other applicable computer bus interface.

The computing system 1700 can also be connected to a router 1764 to establish a wide area network (WAN) 1766 with one or more remote computers 1799. The router 1764 may be connected to the system bus 1728 via a network interface 1744. The remote computers 1799 can also include hard disks 1772 that store application programs 1770.

In another implementation, the computing system 1700 may also connect to the remote computers 1799 via local area network (LAN) 1776 or the WAN 1766. When using a LAN networking environment, the computing system 1700 may be connected to the LAN 1776 through the network interface or adapter 1744. The LAN 1776 may be implemented via a wired connection or a wireless connection. The LAN 1776 may be implemented using Wi-Fi™ technology, cellular technology, Bluetooth™ technology, satellite technology, or any other implementation known to those skilled in the art. The network interface 1744 may also utilize remote access technologies (e.g., Remote Access Service (RAS), Virtual Private Networking (VPN), Secure Socket Layer (SSL), Layer 15 Tunneling (L2T), or any other suitable protocol). These remote access technologies may be implemented in connection with the remote computers 1799. It will be appreciated that the network connections shown are merely examples and other means of establishing a communications link between the computer systems may be used.

A number of program modules may be stored on the hard disk 1750, memory card 1756, optical disk 1758, ROM 1712 or RAM 1716, including an operating system 1718, one or more application programs 1720, and program data 1724. In certain implementations, the hard disk 1750 may store a database system. The database system could include, for example, recorded points. The application programs 1720 may include various mobile applications ("apps") and other applications configured to perform various methods and techniques described herein. The operating system 1718 may be any suitable operating system that may control the operation of a networked personal or server computer.

A user may enter commands and information into the computing system 1700 through input devices such as buttons 1762, which may be physical buttons, virtual buttons, or combinations thereof. Other input devices may include a microphone, a mouse, or the like (not shown). These and other input devices may be connected to the CPU 1730 through a serial port interface 1742 coupled to system bus 1728, but may be connected by other interfaces, such as a parallel port, game port or a universal serial bus (USB).

Certain implementations may be configured to be connected to the transceiver system 110 of a pulse compression radar system 100. In one implementation, the one or more application programs 1720 or 1770 stored in the computer-readable media can include a plurality of instructions that when executed by a processing unit, such as a CPU 1730, cause the computing system to perform any of the techniques, or portions thereof, that are described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, one implementation can include a sound navigation and ranging (SONAR) system, wherein the antenna 112 is replaced with a sound transducer and the relationship between the time delay and distances is based on the speed of sound in water instead of the speed of light.

The above descriptions are directed to certain specific implementations. It is to be understood that the above descriptions are only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Detailed references have been made to various implementations, examples of which are illustrated in the accompanying drawings and figures. In the above detailed descriptions, numerous specific details have been set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

The invention claimed is:

1. A radar system for processing reflected signals, the system comprising:
   a transmitter for transmitting transmit signals comprising one or more bursts of chirp signals, wherein the transmit signals have different chirp pulse lengths or chirp bandwidths,
   a receiver for receiving the reflected signals corresponding to the transmit signals;
   a pulse compressor for compressing the reflected signals;
   a framer for interpreting the reflected signals; and
   a frame generator for combining one or more modified frames associated with the reflected signals into a super-frame with equalized range-resolution and noise floor.

2. The radar system of claim 1, wherein the compressing the reflected signals includes correlating the reflected signals with a corresponding reference signal.

3. The radar system of claim 1, wherein the interpreting the reflected signals comprises generating one or more truncated frames associated with the reflected signals.

4. The radar system of claim 1, wherein the frame generator comprises:
   an equalizer for equalizing the noise floor associated with the one or more reflected signals;
   a noise corrector for correcting a noise distribution associated with the reflected signals;
   a mainlobe reformer for normalizing one or more mainlobes associated with the reflected signals; and
   a resampler for decimating one or more reformed frames associated with the reflected signals.

5. A method for processing reflected signals, the method comprising:
   transmitting transmit signals comprising one or more bursts of chirp signals, wherein the transmit signals have different chirp pulse lengths or chirp bandwidths;
   receiving the reflected signals corresponding to the transmit signals;
   compressing the reflected signals;
   interpreting the reflected signals; and
   combining one or more modified frames associated with the reflected signals into a super-frame with equalized range-resolution and noise floor.

6. The method of claim 5, wherein the reflected signals are associated with a series of transmitted chirp signals.

7. The method of claim 5, wherein compressing the reflected signals includes correlating the reflected signals with a corresponding reference signal.

8. The method of claim 5, wherein interpreting the reflected signals includes generating one or more truncated frames associated with the reflected signals.

9. The method of claim 5, wherein combining the one or more modified frames comprises:
   equalizing the noise floor associated with the reflected signals;
   correcting a noise distribution associated with the reflected signals;
   normalizing one or more mainlobes associated with the reflected signals; and
   decimating one or more reformed frames associated with the reflected signals.

10. The method of claim 9, wherein equalizing the noise floor includes dividing a truncated frame associated with the reflected signals by a noise average.

11. The method of claim 9, wherein correcting the noise distribution includes applying a gain function to a noise floor adjusted frame associated with the reflected signals.

12. The method of claim 9, wherein normalizing the one or more mainlobes includes a weighted max hold process.

13. The method of claim 12, wherein the weighted max hold process includes a mainlobe function.

14. The method of claim 9, wherein combining the one or more modified frames includes concatenating the one or more decimated reformed frames associated with the reflected signals.

15. A non-transitory computer-readable medium having stored thereon a plurality of computer-executable instructions which, when executed by a processor, cause the processor to:
   transmit transmit signals comprising one or more bursts of chirp signals, wherein the transmit signals have different chirp pulse lengths or chirp bandwidths,
   receive reflected signals from a receiver corresponding to the transmit signals;
   perform a compression operation on the reflected signals;
   perform a signal interpretation operation on the reflected signals; and
   combine one or more modified frames associated with the reflected signals into a super-frame with equalized range-resolution and noise floor.

16. The non-transitory computer-readable medium of claim 15, wherein the reflected signals are associated with a series of transmitted chirp signals.

17. The non-transitory computer-readable medium of claim 15, wherein the compression operation includes correlating one or more of the reflected signals with a corresponding reference signal.

18. The non-transitory computer-readable medium of claim 15, wherein the interpretation operation includes generating one or more truncated frames associated with the reflected signals.

19. The non-transitory computer-readable medium of claim 15, further comprising instructions executable by the processor to further cause the processor to:
   equalize the noise floor associated with the reflected signals;
   correct a noise distribution associated with the reflected signals;
   normalize one or more mainlobes associated with the reflected signals; and
   decimate one or more reformed frames associated with the reflected signals.

* * * * *

UNITED STATES PATENT AND TRADEMARK OFFICE
CERTIFICATE OF CORRECTION

PATENT NO. : 10,222,454 B2
APPLICATION NO. : 14/829574
DATED : March 5, 2019
INVENTOR(S) : Lilburn et al.

Page 1 of 1

It is certified that error appears in the above-identified patent and that said Letters Patent is hereby corrected as shown below:

In the Claims

Column 21, Claim 4, Line 41:
"the one or more reflected signals;"
Should read:
"the reflected signals;"

Column 21, Claim 5, Line 57:
"combining one or more modified frames associated with"
Should read:
"combining modified frames associated with"

Signed and Sealed this
Fourteenth Day of May, 2019

Andrei Iancu
*Director of the United States Patent and Trademark Office*